US011966358B1

(12) United States Patent
Shin et al.

(10) Patent No.: US 11,966,358 B1
(45) Date of Patent: Apr. 23, 2024

(54) NEURAL PROCESSOR

(71) Applicant: Rebellions Inc., Seongnam-si (KR)

(72) Inventors: Wongyu Shin, Seongnam-si (KR); Juyeong Yoon, Seongnam-si (KR); Sangeun Je, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/447,226

(22) Filed: Aug. 9, 2023

(30) Foreign Application Priority Data

Dec. 14, 2022 (KR) .................. 10-2022-0174933

(51) Int. Cl.
  *G06F 15/80* (2006.01)
  *G06F 13/36* (2006.01)
  *G06N 3/063* (2023.01)
  *G06N 3/084* (2023.01)

(52) U.S. Cl.
  CPC .............. *G06F 15/80* (2013.01); *G06F 13/36* (2013.01); *G06N 3/063* (2013.01); *G06N 3/084* (2013.01)

(58) Field of Classification Search
  CPC ......... G06F 15/80; G06F 13/36; G06N 3/063; G06N 3/084
  See application file for complete search history.

(56) References Cited

U.S. PATENT DOCUMENTS

| | | | | |
|---|---|---|---|---|
| 7,657,861 | B2* | 2/2010 | Vorbach | G06F 15/7867 716/101 |
| 8,443,169 | B2* | 5/2013 | Pechanek | G06F 9/30145 712/17 |
| 8,924,322 | B2* | 12/2014 | Datta | G06N 3/10 706/29 |
| 10,228,937 | B2* | 3/2019 | Werner | G06N 3/063 |
| 11,423,296 | B2* | 8/2022 | Bichler | G06N 3/045 |
| 11,494,620 | B2* | 11/2022 | Franca-Neto | G06N 3/063 |
| 11,620,501 | B2* | 4/2023 | Nomura | G06N 3/04 706/15 |
| 11,783,917 | B2* | 10/2023 | Jaganathan | G06N 3/08 706/20 |
| 2023/0195836 | A1* | 6/2023 | Pope | G06F 17/16 708/490 |
| 2023/0343414 | A1* | 10/2023 | Vessere | G16B 30/00 |

FOREIGN PATENT DOCUMENTS

KR  10-2258566 B1  6/2021

\* cited by examiner

*Primary Examiner* — Cheng Yuan Tseng
(74) *Attorney, Agent, or Firm* — BROADVIEW IP LAW, PC

(57) ABSTRACT

A processing device comprises a first set of processors comprising a first processor and a second processor, each of which comprises at least one controllable port, a first memory operably coupled to the first set of processors, at least one forward data line configured for one-way transmission of data in a forward direction between the first set of processors, and at least one backward data line configured for one-way transmission of data in a backward direction between the first set of processors. wherein the first set of processors are operably coupled in series via the at least one forward data line and the at least one backward data line.

19 Claims, 33 Drawing Sheets

NEURAL PROCESSOR

CROSS-REFERENCE TO RELATED APPLICATION

This application claims priority under 35 U.S.C § 119 to Korean Patent Application No. 10-2022-0174933 filed on Dec. 14, 2022, in the Korean Intellectual Property Office, the entire contents of which is hereby incorporated by reference.

TECHNICAL FIELD

The disclosure relates to neural processors. More particularly, the disclosure relates to neural processors capable of reconfiguring data paths of neural cores.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention. These neural processing units have a plurality of computation devices therein, and each computation device operates in parallel and thereby enhance computation efficiency.

Recently, in order to maximize computation efficiency, the trend is to gradually increase the number of cores within a computation device. However, if the number of cores increases, data paths must be assigned newly by the increased number of cores. This affects very disadvantageously in terms of scalability, and thus, there exist drawbacks of not only being hard to miniaturize chips but also increasing the complexity of design.

In addition, if data paths are predetermined, there may be disadvantages that power can be wasted unnecessarily since there may arise a case in which more cores than actually needed for computation must be used, and the efficiency of a computation device may be reduced as the most efficient data path cannot be dynamically determined depending on the type of computations performed by the computation device.

SUMMARY

Aspects of the disclosure provide a neural processor capable of reconfiguring data paths.

Aspects of the disclosure provide a neural processor that has relatively high scalability.

Aspects of the disclosure provide a neural processor that has relatively low power consumption.

Aspects of the disclosure provide a neural processor that configures optimized data paths according to data flows.

According to some aspects, a processing device may comprise: a first set of processors comprising a first processor and a second processor, each of which comprises at least one controllable port; a first memory operably coupled to the first set of processors; at least one forward data line configured for one-way transmission of data in a forward direction between the first set of processors; and at least one backward data line configured for one-way transmission of data in a backward direction between the first set of processors, and wherein the first set of processors are operably coupled in series via the at least one forward data line and the at least one backward data line.

According to some aspects, the data paths are configured by controlling controllable ports of the first set of processors.

According to some aspects, a forward data path is configured by turning on a controllable port on the at least one forward data line between the first processor and the second processor and data is transmitted via the forward data path from the first processor to the second processor.

According to some aspects, a backward data path is configured by turning on a controllable port on the at least one backward data line between the first processor the second processor and data is transmitted via the backward data path from the second processor to the first processor.

According to some aspects, a data path is configured by controlling controllable ports of the first set of processors, the data path comprises a first and second forward sub-paths configured on the at least one forward data line and a first and second backward sub-paths configured on the at least one backward data line, the first forward sub-path is from the first memory to the first processor, the second forward sub-path is from the first processor to the second processor, the first backward sub-path is from the second processor to the first processor, and the second backward sub-path is from the first processor to the first memory.

According to some aspects, the data path further comprises a third forward sub-path configured on the at least one forward data line and a third backward sub-path configured on the at least one backward data line, the third forward sub-path is from the second processor to a second memory, the third backward sub-path is from the second memory to the second processor, and the second memory is the same as or different from the first memory.

According to some aspects, a first data path is configured by controlling controllable ports of the first set of processors, the first data path comprises a forward sub-path configured on the at least one forward data line and a backward sub-path configured on the at least one backward data line, the forward sub-path of the first data path is from the first memory to the first processor, and the backward sub-path of the first data path is from the first processor to the first memory, and a second data path is configured by controlling controllable ports of the first set of processors, the second data path comprises a forward sub-path configured on the at least one forward data line and a backward sub-path configured on the at least one backward data line, the backward sub-path of the second data path is from a second memory to the second processor, and the forward sub-path of the second data path is from the second processor to the second memory, wherein the second memory is the same as or different from the first memory.

According to some aspects, a data path is configured by controlling controllable ports of the first set of processors, the data path comprises first and second forward sub-paths configured on the at least one forward data line, the first forward sub-path is from the first memory to the first processor, and the second forward sub-path is from the first processor to a second memory, wherein the second memory is the same as or different from the first memory.

According to some aspects, the at least one forward data line comprises a plurality of forward data lines, and some of the plurality of forward data lines are turned off by controlling controllable ports of the first set of processors.

According to some aspects, the processing device may further comprise a second set of processors comprising a third processor and a fourth processor, wherein the second set of processors are connected in series with each other via a forward data line and a backward data line between the second set of processors.

According to some aspects, the processing device may further comprise an interconnection through which data are moved, wherein the memory, the first set of processors, and the second set of processors are connected to the interconnection, and data are moved between the memory, the first set of processors, and the second set of processors via the interconnection.

According to some aspects, the processing device may further comprise at least one first connection line connected to the at least one forward data line and the first processor; at least one second connection line connected to the at least one backward data line and the first processor; at least one third connection line connected to the at least one forward data line and the second processor; and at least one fourth connection line connected to the at least one backward data line and the second processor.

According to some aspects, the first set of processors are included in a system-on-chip, and the first memory comprises an off-chip memory external to the system-on-chip.

According to some aspects, the processing device may further comprise a shared memory shared by the first set of processors and the second set of processors, wherein the memory comprises the shared memory.

According to some aspects, controllable ports of the first set of processors are implemented by software or firmware.

According to some aspects, a processing device may comprise a first processor; a second processor connected in series with the first processor in a forward direction; a third processor connected in series with the second processor in the forward direction; and a first memory connected in series with the first processor in a backward direction, wherein data paths for the first core, the second core, the third core, and the first memory are configured, wherein the data paths comprise a data movement path in the forward direction and a data movement path in the backward direction, and the data paths are configured even when at least one of the first processor, the second processor, or the third processor is inoperative.

According to some aspects, wherein if the first processor and the third processor are operative and the second processor is inoperative, the first processor is provided with first data from the first memory and generates second data by computing the first data, the second processor is provided with the second data from the first processor and provides the second data to the third processor, and the third processor is provided with the second data from the second processor and generates third data by computing the second data.

According to some aspects, data lines connecting the first core to the third core comprise a plurality of lines, and all of the plurality of lines are turned on or some of the plurality of lines are turned off according to a bandwidth of data provided from the first memory.

According to some aspects, the processing device may further comprise a fourth processor that is not directly connected to the first processor; a fifth processor connected in series with the fourth processor in the forward direction; and an interconnection configured to perform data exchange between the first processor and the fourth processor.

According to some aspects, a processing device may comprise a first processor; a second processor connected in series with the first processor in a forward direction; a third processor connected in series with the second processor in the forward direction; and a first memory connected in series with the first processor in a backward direction, wherein data paths for the first processor, the second processor, the third processor, and the first memory are configured in real time.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

Even if the number of neural cores is changed, the neural processor of the disclosure is relatively simple to change the design resulting therefrom and thus has relatively high scalability.

The neural processor of the disclosure can reconfigure data paths relatively easily, and can increase computation efficiency by appropriately changing the data paths as necessary.

The neural processor of the disclosure can minimize power consumption by turning off unused neural cores or turning off some of the unused data lines.

In addition to the foregoing, the specific effects of the disclosure will be described together while elucidating the specific details for carrying out the embodiments below.

DETAILED DESCRIPTION OF THE PREFERRED EMBODIMENTS

Figure 1:
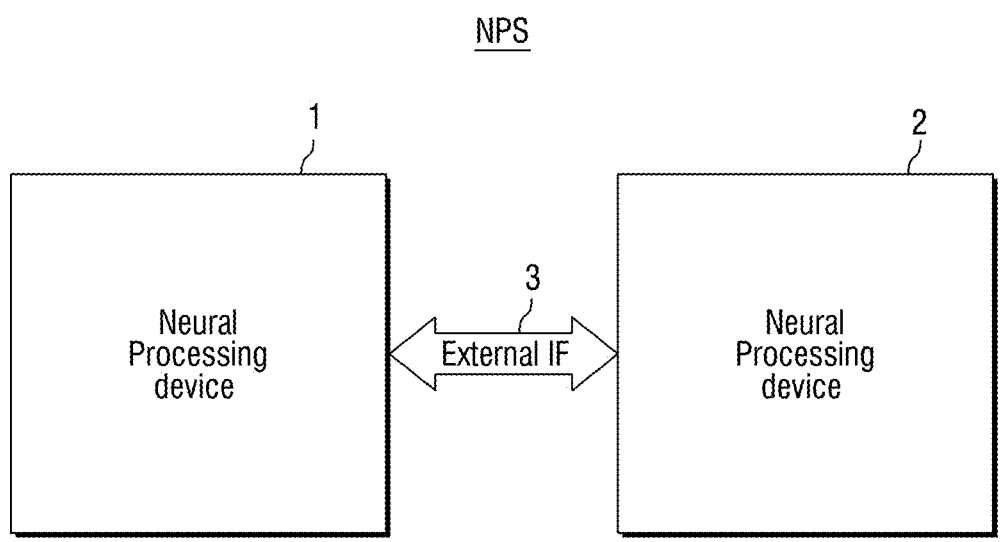
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device in accordance with some embodiments of the disclosure will be described with reference to FIGS. 1 to 32.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning computations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, in a neural processing system NPS, three or more neural processing devices may be connected to each other via the external interface 3. Also, conversely, a neural processing system NPS in accordance with some embodiments may include only one neural processing device.

In this case, each of the first neural processing device 1 and the second neural processing device 2 may be a processing device other than the neural processing device. In some embodiments, each of the first neural processing device 1 and the second neural processing device 2 may be a graphics processing unit (GPU), a central processing unit (CPU), and other types of processing units as well. In the following, the first neural processing device 1 and the second neural processing device 2 will be described as neural processing devices for convenience.

Figure 2:
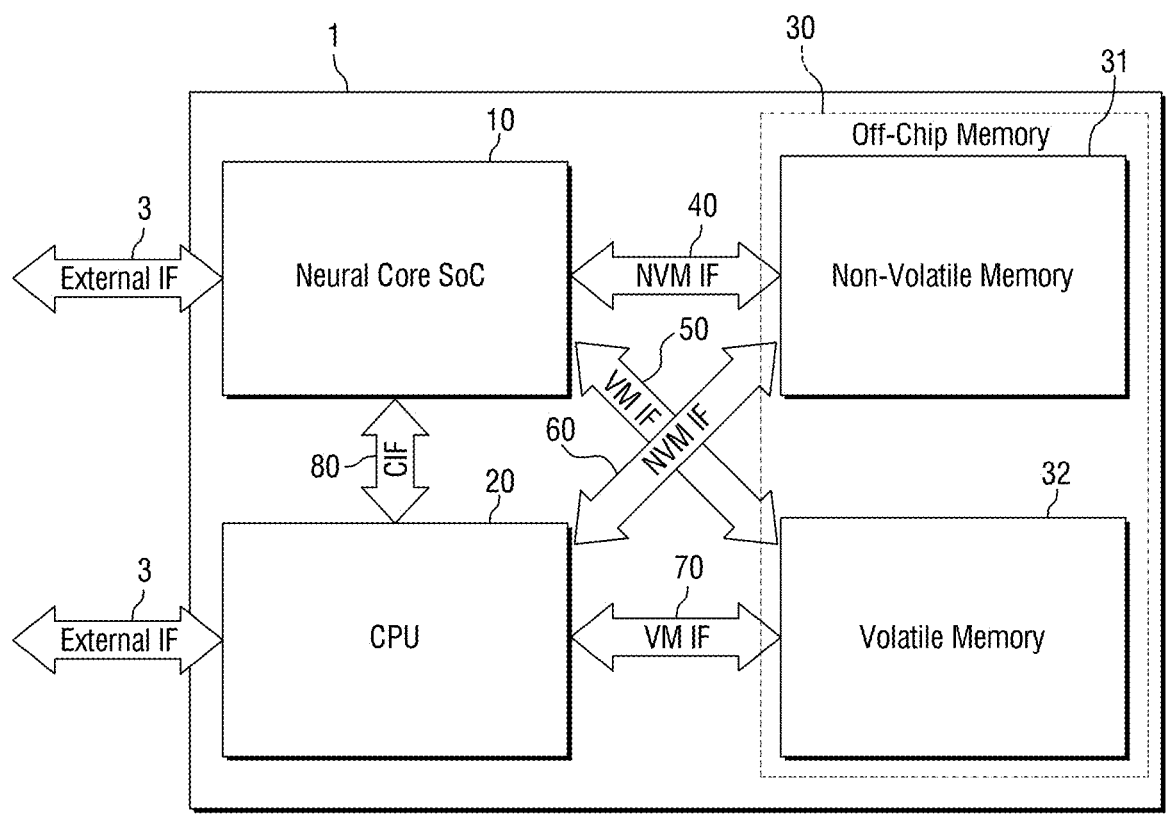
FIG. 2 is a block diagram for illustrating the neural processing device of FIG. 1 in detail.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, a second volatile memory interface 70 and a control interface (CIF) 80.

The neural core SoC 10 may be a system on a chip device. The neural core SoC 10 can be an artificial intelligence computation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external computation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program computations. The CPU 20 is a general-purpose computation device and may have low efficiency in performing simple parallel computations that are frequently used in deep learning. Accordingly, there can be high efficiency by performing computations in deep learning inference and training tasks by the neural core SoC 10.

The CPU 20 may exchange data with other external computation units via the external interface 3. Further, the CPU 20 may be connected to the non-volatile memory 31 and the volatile memory 32 via the second non-volatile memory interface 60 and the second volatile memory interface 70, respectively.

The CPU 20 may also transfer tasks to the neural core SoC 10 via commands. In some embodiments, the CPU 20 may be a kind of host that gives instructions to the neural core SoC 10. In some embodiments, the neural core SoC 10 can efficiently perform parallel computation tasks such as deep learning tasks according to the instructions of the CPU 20.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

The control interface 80 may be an interface for transferring control signals between the CPU 20 and the neural core SoC 10. The control interface 80 may transmit commands of the CPU 20 and transmit responses thereto of the neural core SoC 10. The control interface 80 may be, for example, PCIe (PCI Express), but is not limited thereto.

Figure 3:
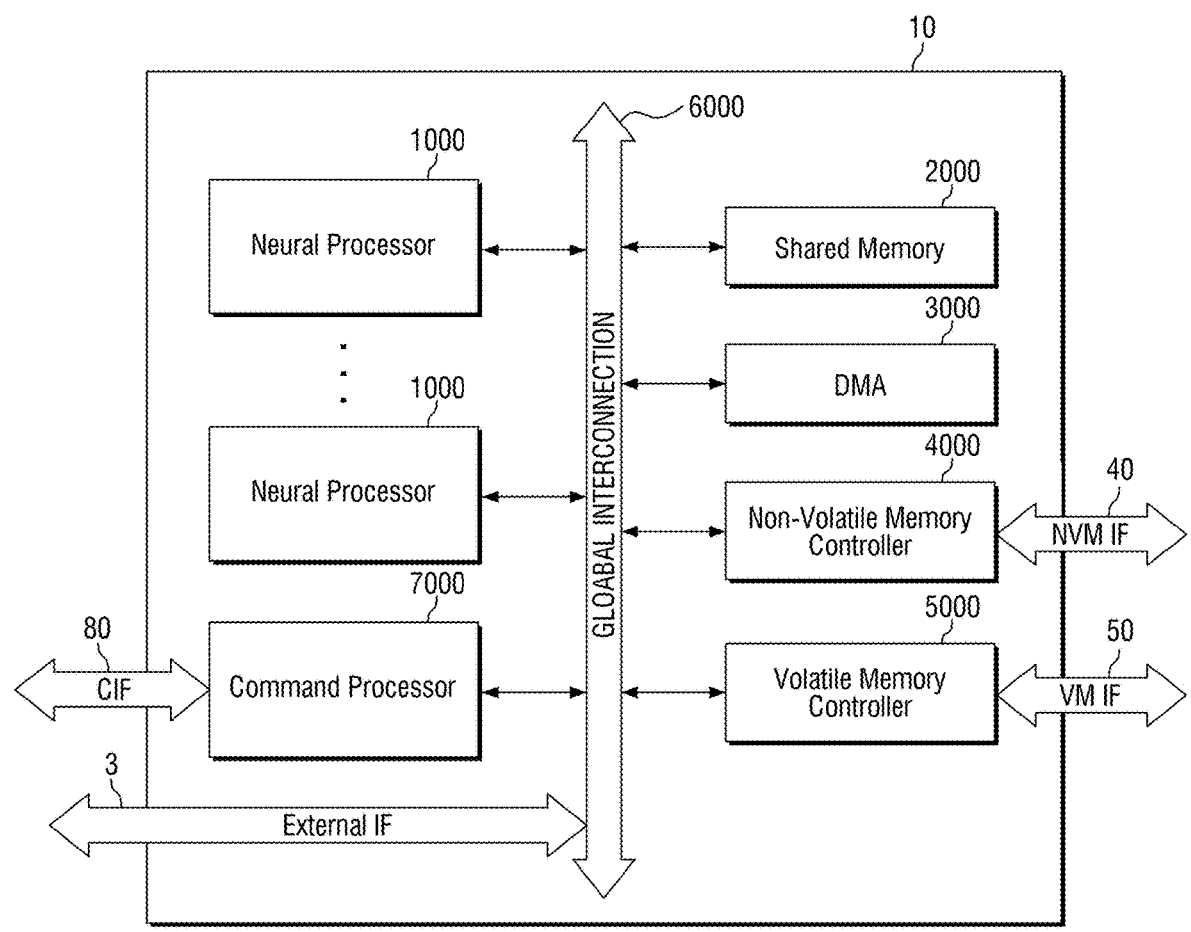
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, a direct memory access (DMA) 3000, a non-volatile memory controller 4000, a volatile memory controller 5000, a command processor 7000, and a global interconnection 6000.

The neural processor 1000 may be a computation device that directly performs computation tasks. If there exist a plurality of neural processors 1000, computation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of neural processors 1000. In addition, the shared memory 2000 may receive data from the off-chip memory 30, store the data temporarily, and transfer the data to neural processors 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control movements of data without needs for the neural processor 1000 or CPU 20 to control the input/output of data. Accordingly, the DMA 3000 may control data movements between memories, thereby minimizing a number of interrupts of the neural processor 1000 or CPU 20.

The DMA 3000 may control the data movements between the shared memory 2000 and the off-chip memory 30. Via the authority of the DMA 3000, the non-volatile memory controller 4000 and the volatile memory controller 5000 may perform movements of data.

The non-volatile memory controller 4000 may control tasks of reading from or writing onto the non-volatile memory 31. The non-volatile memory controller 4000 may control the non-volatile memory 31 via the first non-volatile memory interface 40. In this case, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control tasks of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The command processor 7000 may be connected to the control interface 80. The command processor 7000 may receive control signals from the CPU 20 via the control interface 80. The command processor 7000 may generate tasks via the control signals received from the CPU 20 and transmit the control signals to neural processors 1000. Further, the command processor 7000 may receive completion reports for the tasks from neural processors 1000.

The global interconnection 6000 may connect the at least one neural processor 1000, the shared memory 2000, the DMA 3000, the non-volatile memory controller 4000, the command processor 7000, and the volatile memory controller 5000 to one another. In addition, the external interface 3 may also be connected to the global interconnection 6000. The global interconnection 6000 may be a path through which data travel between the at least one neural processor 1000, the shared memory 2000, the DMA 3000, the non-volatile memory controller 4000, the volatile memory controller 5000, the command processor 7000, and the external interface 3.

The global interconnection 6000 may transmit not only data but also control signals and signals for synchronization. In the neural processing device in accordance with some embodiments of the disclosure, each neural processor 1000 may directly transmit and receive the synchronization signals. Accordingly, latencies due to transmissions of the synchronization signals generated by the command processor 7000 can be minimized.

In some embodiments, if there exist a plurality of neural processors 1000, there may be dependencies of individual tasks in which a task of one neural processor 1000 needs to be finished before the next neural processor 1000 can start a new task. The end and start of these individual tasks can be checked via the synchronization signals, and in the conventional techniques, the command processor 7000 or the host, i.e., the CPU 20, was exclusively responsible for both receiving these synchronization signals and instructing the start of a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Therefore, in the neural processing device in accordance with some embodiments of the disclosure, each neural processor 1000, instead of the command processor 7000, may directly transmit some of the synchronization signals to other neural processors 1000 according to task dependencies. In this case, several neural processors 1000 can perform the synchronization tasks in parallel as compared with the method managed by the command processor 7000, thereby minimizing the latency due to synchronization.

In addition, the command processor 7000 needs to perform the task scheduling of the neural processors 1000 according to a task dependency, and the overhead of such scheduling may increase significantly as the number of neural processors 1000 increases. Therefore, in the neural processing device in accordance with some embodiments of the disclosure, scheduling tasks are also performed in part by individual neural processors 1000, and hence scheduling burden resulting therefrom can be reduced, thereby improving the performance of the device.

Furthermore, the neural processing device in accordance with some embodiments of the disclosure can carry out monitoring whether a task is completed, an event occurs, a task is delayed, or the like in the neural cores of each neural processor 1000, and can minimize intervention of the command processor 7000 and reduce load on the command processor 7000, thereby improving the performance of the device.

Moreover, the neural processing device in accordance with some embodiments of the disclosure can selectively generate completion reports by setting whether to monitor tasks for each task. And the neural processing device in accordance with some embodiments of the disclosure can be configured to modify whether to generate a completion report if a report to the command processor 7000 is required. Accordingly, it may be possible to report tasks that require an alert without carrying out monitoring all tasks, and stable monitoring of tasks may be possible while reducing the load on the command processor 7000.

Figure 4:
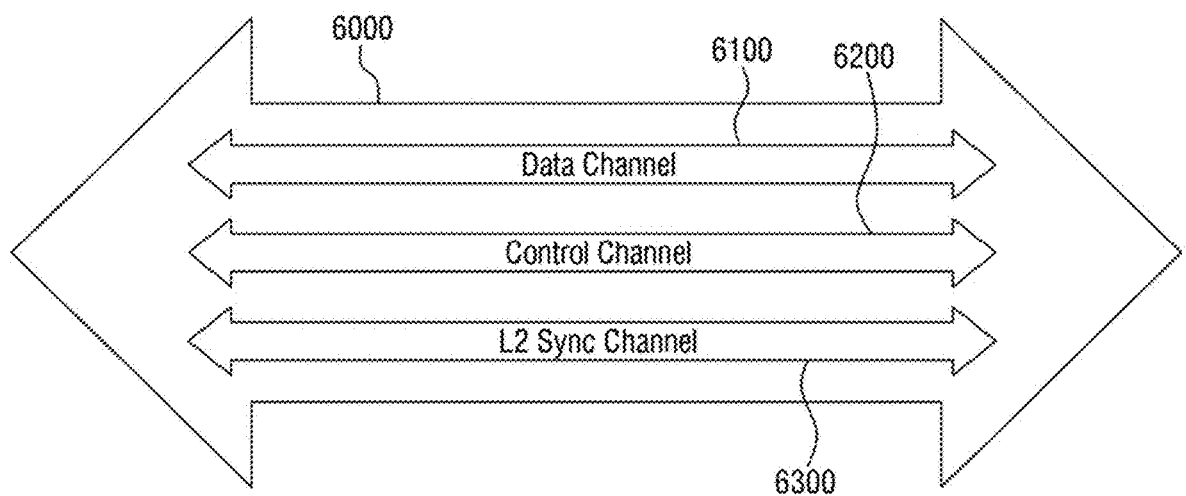
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, the command processor 7000, and the external interface 3 may exchange control signals with one another. In particular, the command processor 7000 may transmit various control signals to neural processors 1000.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, the command processor 7000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
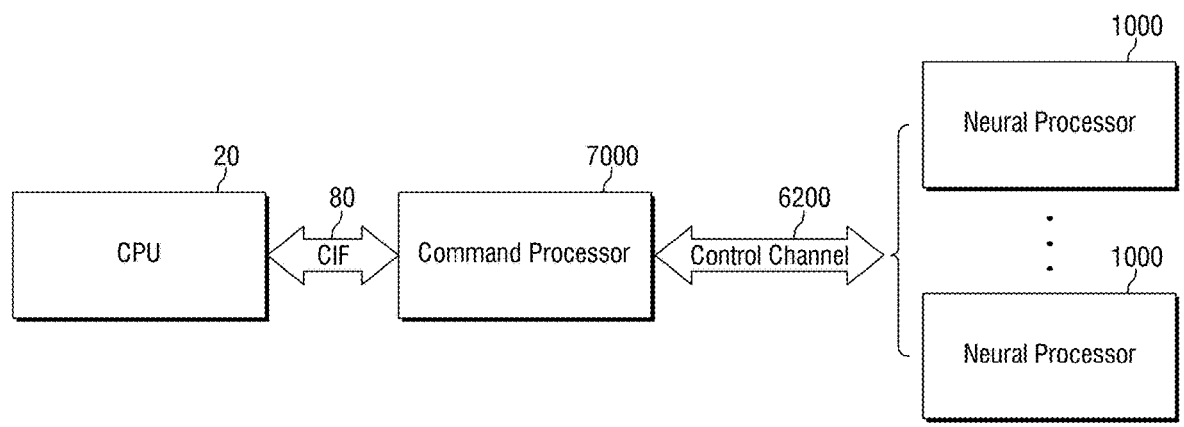
FIG. 5 is a block diagram for illustrating a flow of control signals of the neural processing device of FIG. 1.

FIG. 5 is a block diagram for illustrating a flow of control signals of the neural processing device of FIG. 1.

Referring to FIG. 5, the CPU 20 may transfer control signals to the command processor 7000 via the control interface 80. In this case, a control signal may be a signal instructing execution of each operation, such as a computation task or a data load/store task.

The command processor 7000 may receive the control signals and transfer the control signals to at least one neural processor 1000 via the control channel 6200. Each control signal may be stored in the neural processor 1000 as each task.

Figure 6:
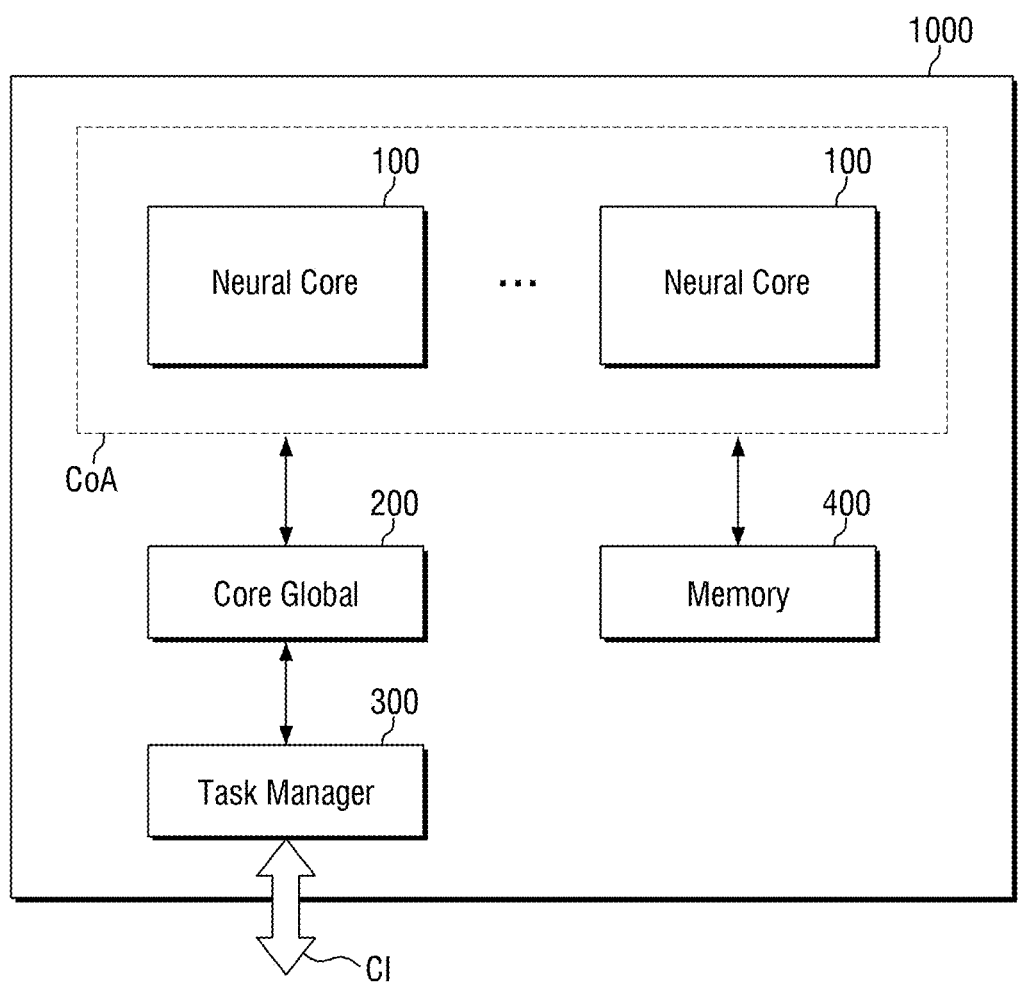
FIG. 6 is a block diagram for schematically illustrating the neural processor of FIG. 3.

FIG. 6 is a block diagram for schematically illustrating the neural processor of FIG. 3.

Referring to FIG. 6, the neural processor 1000 may include a core array CoA, a core global 200, a task manager 300, and a memory 400. In this case, the core global 200 and the task manager 300 may be referred to respectively as a core global circuit and a task manager circuit. However, for the sake of convenience, the terms are respectively unified as a core global and a task manager. In addition, each of the core global 200 and the task manager 300 may be implemented as a circuit or circuitry.

The core array CoA may include a plurality of neural cores 100. That is, a particular array of the plurality of neural cores 100 is defined as a core array CoA. The plurality of neural cores 100 may divide and perform tasks of the neural processor 1000. A number of neural cores 100 may be 8, for example. However, the embodiment is not limited thereto.

The neural cores 100 may receive task information from the core global 200 and perform tasks according to the task information. In this case, a task may be defined by a control signal, and the task may be any one of memory operations. A memory operation may be, for example, any one of micro-DMA (μDMA), LP micro-DMA (Low Priority μDMA), store μDMA (STμDMA), or a pre-processing task.

Specifically, a micro-DMA task may be a task in which the neural core 100 loads a program or data from the shared memory 2000 or the off-chip memory 30 to the L0 memory 120. An LP micro-DMA task may be a load task for a program or data to be used later rather than a current program or data, unlike a general micro-DMA task. Since such a task has a low priority, it can be identified differently from the micro-DMA task. An ST micro-DMA task may be a store task that stores data from the L0 memory 120 of the neural core 100 to the shared memory 2000 or the off-chip memory 30. A pre-processing task may include a task that pre-loads data such as a large number of lookup tables in the CPU 20.

The memory 400 may be a memory shared by neural cores 100 in the neural processor 1000. The memory 400 may store data of neural cores 100. In addition, the memory 400 may transfer data to neural cores 100. On the other hand, the memory 400 may be a memory shared by neural processors 1000 in the neural core SoC 10. In this case, the memory 400 may store data of neural processors 1000 and may transfer the data to neural processors 1000.

In some embodiments, the memory 400 may be an on-chip memory included in the neural processor 1000 or an off-chip memory arranged outside the neural processor 1000. For example, the memory 400 may be an L1 shared memory included in the neural processor 1000, or the memory 400 may be the shared memory 2000 of FIG. 3. The shared memory 2000 of FIG. 3 may be expressed as an L2 shared memory in another term. The L1 shared memory may be a memory corresponding to the level of the neural processor, i.e., L1 (level 1). The L2 shared memory may be a memory corresponding to the neural processing device, i.e., L2 (level 2). In some embodiments, the L2 shared memory may be shared by the neural processor 1000, and the L1 shared memory 400 may be shared by the neural core 100.

The neural cores 100 may receive task information from the core global 200 and perform tasks according to the task information. In this case, a task may be a computation task (or, calculation task) or a task related to a memory operation, and may include information about data paths. A task may be defined by a control signal. The task information is information about a task, and may be information about a type of a task, a form of a task, additional information about a task, and the like.

The neural cores 100 may transfer a completion signal indicating completion of execution of a task to the core global 200.

The task manager 300 may receive tasks from a control interconnection CI. In this case, the control interconnection CI may be a generic term for transmission interfaces that transfer tasks from the command processor 7000.

The task manager 300 may receive tasks, generate task information, and transmit the task information to the core global 200. In some embodiments, the task information may include information about data paths. Further, the task manager 300 may receive completion signals via the core global 200, generate completion reports accordingly, and transmit the completion reports to the command processor 7000 via the control interconnection CI.

The core global 200 may be a wire structure connected in hardware within the neural cores 100. Although not shown, the core global 200 may be a structure connecting all of the neural cores 100, the memory 400, and the task manager 300.

The core global 200 may receive task information from the task manager 300 and transfer the task information to the neural cores 100, and may receive completion signals related thereto from the neural cores 100. Subsequently, the core global 200 may transfer the completion signals to the task manager 300.

Figure 7:
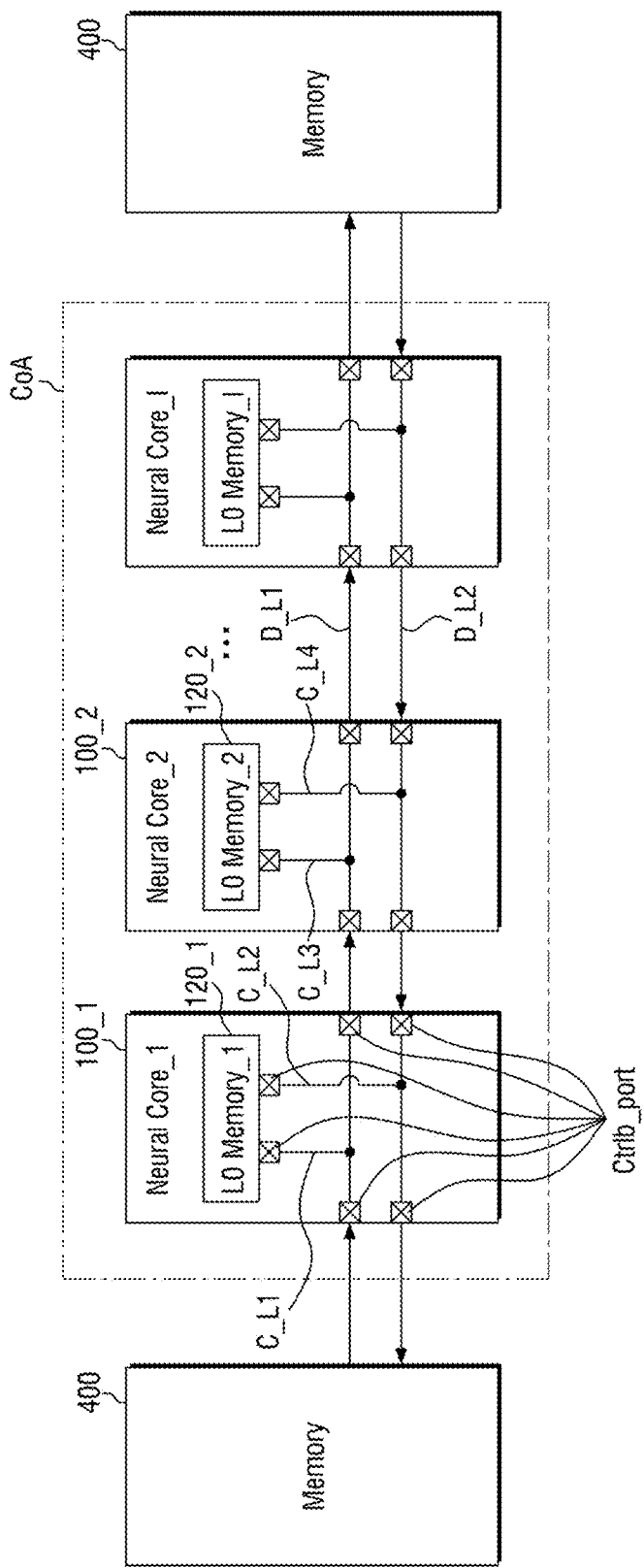
FIG. 7 is a diagram for illustrating data lines and connection lines connecting neural cores and memories included in a neural processor in accordance with some embodiments of the disclosure.

FIG. 7 is a diagram for illustrating data lines and connection lines connecting neural cores and a memory included in a neural processor in accordance with some embodiments of the disclosure.

Referring to FIGS. 6 and 7, the core array CoA may include a plurality of neural cores 100. Each of the plurality of neural cores 100 may include an L0 memory 120. Although FIGS. 7 to 14 show that each of the neural cores 100 includes only the L0 memory 120, this is merely for easily describing the transmission paths of data, and embodiments are not limited thereto. The description of other components included in the neural core 100 will be described later with reference to FIG. 16.

In addition, the core array CoA may include a first data line D_L1 through which data are transmitted in a first direction, and a second data line D_L2 through which data are transmitted in a second direction opposite to the first direction. The first direction and the second direction may be referred to as a forward direction and a backward direction, respectively. In some embodiments, the core array CoA can transmit data in both directions.

The plurality of neural cores 100 may be connected in series with each other via the first data line D_L1. Further, the plurality of neural cores 100 may be connected in series with each other via the second data line D_L2. In other words, the plurality of neural cores 100 may have a structure in which they are connected in series with each other by the first data line D_L1 and the second data line D_L2.

The first data line D_L1 may connect the memory 400 and the core array CoA. Further, the second data line D_L2 may connect the memory 400 and the core array CoA. The connection between the memory 400 and the core array CoA may be directly made via the first data line D_L1 and the second data line D_L2, or indirectly made via a local interconnector to be described later. For the convenience of description, the neural core 100 connected to the memory 400 is defined as a first neural core 100_1, and the neural core 100 connected in series with the first neural core 100_1 is defined as a second neural core 100_2. In addition, the L0 memory 120 included in the first neural core 100_1 is defined as a first L0 memory 120_1, and the L0 memory 120 included in the second neural core 100_2 is defined as a second L0 memory 120_2. However, the selection of these terms is merely for the convenience of description, and the embodiments are not limited to these terms.

In some embodiments, the core array CoA may include a connection line connecting the first data line D_L1 and the L0 memory 120 and a connection line connecting the second data line D_L2 and the L0 memory 120. For example, the core array CoA may include a first connection line C_L1 connecting the first data line D_L1 and the first L0 memory 120_1, and a second connection line C_L2 connecting the second data line D_L2 and the first L0 memory 120_1. Furthermore, the core array CoA may include a third connection line C_L3 connecting the first data line D_L1 and the second L0 memory 120_2, and a fourth connection line C_L4 connecting the second data line D_L2 and the second L0 memory 120_2.

In some embodiments, the first neural core 100_1 and the second neural core 100_2 may be connected in series with each other via the first data line D_L1 and the second data line D_L2. In addition, the first L0 memory 120_1 included in the first neural core 100_1 may be connected to the first data line D_L1 via the first connection line C_L1. Further, the first L0 memory 120_1 included in the first neural core 100_1 may be connected to the second data line D_L2 via the second connection line C_L2. Furthermore, the second L0 memory 120_2 included in the second neural core 100_2 may be connected to the first data line D_L1 via the third connection line C_L3. Moreover, the second L0 memory 120_2 included in the second neural core 100_2 may be connected to the second data line D_L2 via the fourth connection line C_L4.

According to some embodiments, the core array CoA may include controllable ports Ctrlb_port that can be controlled on/off by software, firmware, or the task manager 300. According to some embodiments, the controllable ports Ctrlb_port may be implemented via hardware, software, or firmware. According to some embodiments, the task manager 300 of the neural processor 1000 may configure data paths by controlling on/off of the controllable ports Ctrlb_port included in each core array CoA via a descriptor, but embodiments are not limited thereto. For example, in some other embodiments, data paths may also be configured by controlling the controllable ports Ctrlb_port via software or firmware. In the following, it will be described that the task manager 300 controls the controllable ports Ctrlb_port and configures data paths accordingly for convenience of description.

The controllable ports Ctrlb_port may be installed in the first data line D_L1, the second data line D_L2, and the connection line, and may set data movement paths. In some embodiments, the controllable ports Ctrlb_port may be disposed between the memory 400 and the neural core 100, between the plurality of neural cores 100, and between the connection line and the L0 memory 120, and the task manager 300 may appropriately control the controllable ports Ctrlb_port to thereby configure data movement paths. In some embodiments, the task manager 300 may fix the configured data paths or may reconfigure the data paths in real time.

For example, the first data line D_L1 may include the controllable ports Ctrlb_port between the memory 400 and the first neural core 100_1 and between the first neural core 100_1 and the second neural core 100_2. That is, the task manager 300 may configure a data movement path in a first direction between the memory 400 and the first neural core 100_1 by controlling the controllable port Ctrlb_port between the memory 400 and the first neural core 100_1. Further, the task manager 300 may configure a data movement path in the first direction between the first neural core 100_1 and the second neural core 100_2 by controlling the controllable ports Ctrlb_port between the first neural core 100_1 and the second neural core 100_2.

In addition, for example, the second data line D_L2 may include the controllable ports Ctrlb_port between the memory 400 and the first neural core 100_1 and between the first neural core 100_1 and the second neural core 100_2. That is, the task manager 300 may configure a data movement path in a second direction between the memory 400 and the first neural core 100_1 by controlling the controllable port Ctrlb_port between the memory 400 and the first neural core 100_1. Further, the task manager 300 may configure a data movement path in the second direction between the first neural core 100_1 and the second neural core 100_2 by controlling the controllable ports Ctrlb_port between the first neural core 100_1 and the second neural core 100_2.

Further, for example, the first connection line C_L1 may include a controllable port Ctrlb_port between the first data line D_L1 and the first L0 memory 120_1. That is, the task manager 300 may configure a data movement path in the first direction between the first data line D_L1 and the first L0 memory 120_1 by controlling the controllable port Ctrlb_port between the first data line D_L1 and the first L0 memory 120_1. Similarly, each of the second connection line C_L2, the third connection line C_L3, and the fourth connection line C_L4 may include a controllable port Ctrlb_port, and the task manager 300 may configure data movement paths in the first direction or the second direction by controlling the controllable ports Ctrlb_port. The data movement to the L0 memory 120 may mean, but not limited to, that computation is performed in a processing unit (160 in FIG. 16) corresponding to the L0 memory 120 for the convenience of description. In some embodiments, there may also be cases in which even if data are provided to the L0 memory 120, it may be outputted without computation.

Hereinafter, embodiments will be described with i-th unit (i=1 ... N). The 1st unit may be a memory 400, the i-th unit (i=2 ... N−1) may be a (i−1)-th neural core, and the N-th unit may be the memory 400 or a memory different from the memory 400. The i-th unit (i=2 ... N−1) may have a first port on the first data line D_L1 in the backward direction, a second port on the first data line D_L1 in the forward direction, a third port on the second data line D_L2 in the backward direction, a fourth port on the second data line D_L2 in the forward direction, a fifth port between an L0 memory of the i-th unit and the first data line D_L1, and a sixth port between the L0 memory of the i-th unit and the second data line D_L2. In some embodiments, a single port on the first data line D_L1 or the second data line D_L2 between the i-th unit and the (i+1) unit may function as a port installed in the i-th unit and a port installed in the (i+1) unit. In some embodiments, the single port may be installed in the i-th unit or the (i+1)-th unit, or be disposed between the i-th unit and the (i+1)-th unit. A port between the i-th unit and the (i+1)-th unit or a port in the forward direction of the i-th may be referred to as one or more ports between the i-th unit and the (i+1)-th unit regardless of where the one or more ports are installed. Similarly, a port between the (i−1)-th unit and the i-th unit or a port in the backward direction of the i-th may be referred to as one or more ports between the (i−1)-th unit and the i-th unit regardless of where the one or more ports are installed.

The first data line D_L1, the second data line D_L2, the first to fourth connection lines C_L1 to C_L4, and the controllable ports Ctrlb_port may be referred to respectively as a first data line circuit, a second data line circuit, first to fourth connection line circuits, and controllable port circuits. However, for the sake of convenience, the terms are respectively unified as a first data line, a second data line, first to fourth connection lines, and controllable ports. In addition, each of the first data line D_L1, the second data line D_L2, the first to fourth connection lines C_L1 to C_L4, and the controllable ports Ctrlb_port may be implemented as a circuit or circuitry.

In summary, the plurality of neural cores 100 included in the core array CoA in accordance with some embodiments may be connected in series with each other by the first data line D_L1 and the second data line D_L2. In addition, each of the L0 memories 120 may be connected to each other via the first data line D_L1 and the second data line D_L2. Moreover, the core array CoA may include the controllable ports Ctrlb_port capable of controlling on/off. Therefore, the task manager 300 may configure movement paths for the data provided from the memory 400 to the plurality of neural cores 100 by controlling on/off of the controllable ports Ctrlb_port. In the following, movement paths of data configured by the task manager 300 will be described by way of example.

Figure 8A:
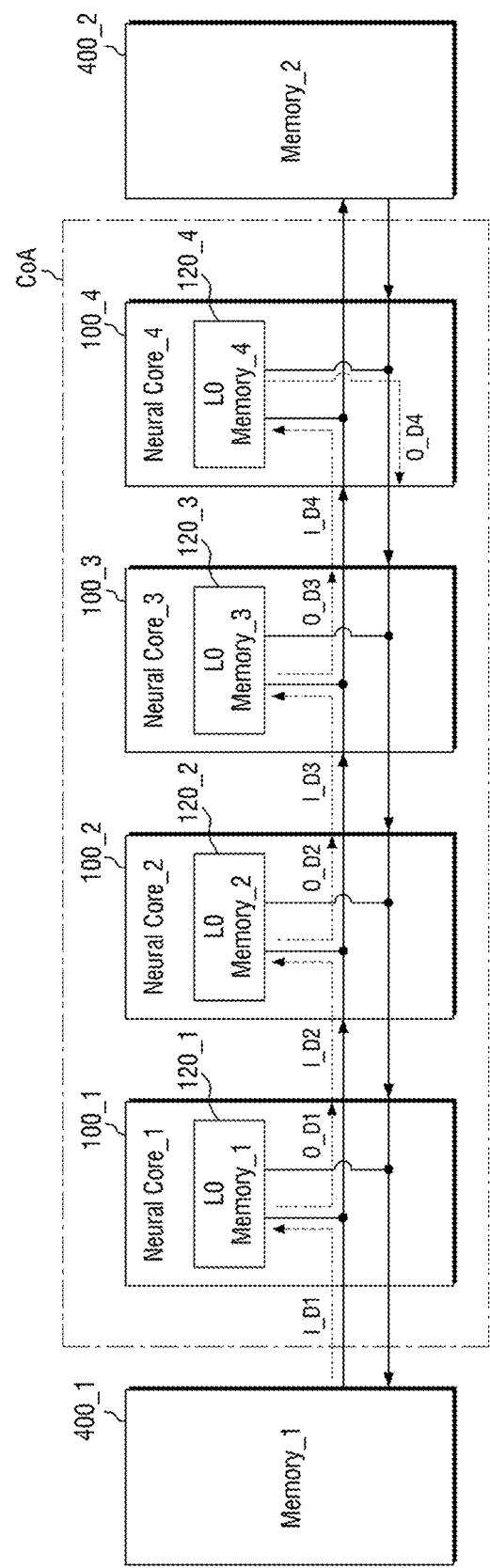
FIGS. 8A and 8B are example diagrams for illustrating a first data path in accordance with some embodiments of the disclosure.
Figure 8B:
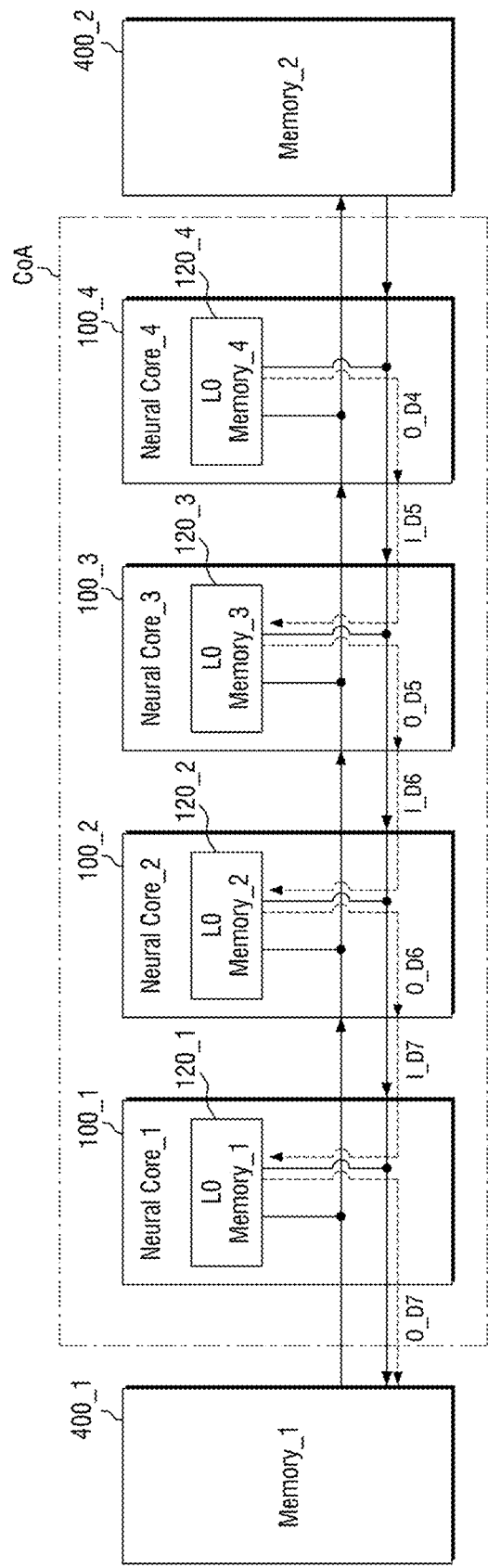

FIGS. 8A and 8B are example diagrams for illustrating a first data path in accordance with some embodiments of the disclosure. For convenience of description, the description is given assuming that the neural processor 1000 includes four neural cores 100, and it is apparent that embodiments are not limited to the number of neural cores 100. Further, in the following, descriptions that are identical to or similar to those described above will be omitted or simplified for the convenience of description.

Referring to FIGS. 6, 7, and 8A, the neural processor 1000 may include a first memory 400_1, a second memory 400_2, and a core array CoA. The core array CoA may include a first neural core 100_1, a second neural core 100_2, a third neural core 100_3, and a fourth neural core 100_4. The first memory 400_1 and the second memory 400_2 may be the same memory or different memories. In some embodiments, the term 'data path' may be defined to refer to a path through which the data outputted from the memory 400 is inputted to the memory 400. In some embodiments, the 'data path' may refer to a path through which data moves from the memory 400 to the core array CoA and from the core array CoA to the memory 400. However, the definition of such a term is for convenience of description, and the embodiments are not limited to such a term.

The first neural core 100_1 may include a first L0 memory 120_1. The second neural core 100_2 may include a second L0 memory 120_2. The third neural core 100_3 may include a third L0 memory 120_3. The fourth neural core 100_4 may include a fourth L0 memory 120_4.

According to some embodiments, the task manager 300 may provide first input data I_D1 to the first neural core 100_1 by turning on the controllable port Ctrlb_port on the first data line D_L1 between the first memory 400_1 and the first neural core 100_1. In addition, the task manager 300 may provide the first input data I_D1 to the first L0 memory 120_1 by controlling the controllable port Ctrlb_port. The first input data I_D1 provided to the first L0 memory 120_1 may be computed by a processing unit of the first neural core 100_1 to generate first output data O_D1. In some embodiments, the first neural core 100_1 may generate the first output data O_D1 by using the first input data I_D1. The task manager 300 may control the controllable ports Ctrlb_port to provide the first output data O_D1 to the outside of the first neural core 100_1.

The task manager 300 may control the controllable ports Ctrlb_port to provide the first output data O_D1 as second input data I_D2 to the second neural core 100_2. In addition, the task manager 300 may control the controllable ports Ctrlb_port to provide the second input data I_D2 to the second L0 memory 120_2. In some embodiments, the task manager 300 may turn on the controllable port Ctrlb_port on the first data line D_L1 between the first neural core 100_1 and the second neural core 100_2. Hereinafter, explanation on how to control the controllable ports Ctrlb_port will be omitted for convenience, since the person of ordinary skill in the art can induce how to control. The second input data I_D2 provided to the second L0 memory 120_2 may be computed by a processing unit of the second neural core 100_2 to generate second output data O_D2. In some embodiments, the second neural core 100_2 may generate the second output data O_D2 by using the second input data I_D2. The task manager 300 may control the controllable ports Ctrlb_port to provide the second output data O_D2 to the outside of the second neural core 100_2.

Likewise, the task manager 300 may control the controllable ports Ctrlb_port to provide the second output data O_D2 as third input data I_D3 to the third L0 memory 120_3 of the third neural core 100_3. The third input data I_D3 provided to the third L0 memory 120_3 may be computed by a processing unit of the third neural core 100_3 to generate third output data O_D3. The task manager 300 may control the controllable ports Ctrlb_port to provide the third output data O_D3 to the outside of the third neural core 100_3.

In addition, the task manager 300 may control the controllable ports Ctrlb_port to provide the third output data O_D3 as fourth input data I_D4 to the fourth L0 memory 120_4 of the fourth neural core 100_4. The fourth input data I_D4 provided to the fourth L0 memory 120_4 may be computed by a processing unit of the fourth neural core 100_4 to generate fourth output data O_D4. The task manager 300 may control the controllable ports Ctrlb_port to provide the fourth output data O_D4 to the outside of the fourth neural core 100_4.

That is, the task manager 300 may move data in a first direction by controlling the controllable ports Ctrlb_port. For example, the task manager 300 may move data from the first memory 400_1 to the first L0 memory 120_1, from the first L0 memory 120_1 to the second L0 memory 120_2, from the second L0 memory 120_2 to the third L0 memory 120_3, and from the third L0 memory 120_3 to the fourth L0 memory 120_4, by controlling the controllable ports Ctrlb_port.

Referring to FIGS. 6, 7, and 8B, the task manager 300 may control the controllable ports Ctrlb_port to provide the fourth output data O_D4 as fifth input data I_D5 to the third neural core 100_3. In addition, the task manager 300 may control the controllable port Ctrlb_port to provide the fifth input data I_D5 to the third L0 memory 120_3. The fifth input data I_D5 provided to the third L0 memory 120_3 may be computed by the processing unit of the third neural core 100_3 to generate fifth output data O_D5. In some embodiments, the third neural core 100_3 may generate the fifth output data O_D5 by using the fifth input data I_D5. The task manager 300 may control the controllable ports Ctrlb_port to provide the fifth output data O_D5 to the outside of the third neural core 100_3.

Similarly, the task manager 300 may control the controllable ports Ctrlb_port to provide the fifth output data O_D5 as sixth input data I_D6 to the second L0 memory 120_2 of the second neural core 100_2. The sixth input data I_D6 provided to the second L0 memory 120_2 may be computed by the processing unit of the second neural core 100_2 to generate sixth output data O_D6. The task manager 300 may control the controllable ports Ctrlb_port to provide the sixth output data O_D6 to the outside of the second neural core 100_2.

In addition, the task manager 300 may control the controllable ports Ctrlb_port to provide the sixth output data O_D6 as seventh input data I_D7 to the first L0 memory 120_1 of the first neural core 100_1. The seventh input data I_D7 provided to the first L0 memory 120_1 may be computed by the processing unit of the first neural core 100_1 to generate seventh output data O_D7. The task manager 300 may control the controllable ports Ctrlb_port to provide the seventh output data O_D7 to the outside of the first neural core 100_1. The task manager 300 may control to store the seventh output data O_D7 in the first memory 400_1.

That is, the task manager 300 may move data in a second direction by controlling the controllable ports Ctrlb_port. For example, the task manager 300 may move data from the fourth L0 memory 120_4 to the third L0 memory 120_3, from the third L0 memory 120_3 to the second L0 memory 120_2, from the second L0 memory 120_2 to the first L0 memory 120_1, and from the first L0 memory 120_1 to the first memory 400_1, by controlling the controllable ports Ctrlb_port.

According to some embodiments, the seventh output data O_D7 provided to the first memory 400_1 may be provided again as input data to the first L0 memory 120_1 of the first neural core 100_1. The input data provided to the first L0 memory 120_1 may be computed by the processing unit of the first neural core 100_1 to generate output data. The generated output data may be provided to the second L0 memory 120_2 of the second neural core 100_1. In some embodiments, the task manager 300 may configure a first data path so that data repeatedly circulates through the first neural core 100_1 to the fourth neural core 100_4. In some embodiments, the task manager 300 may configure data paths in a theoretically infinite length by repeatedly configuring the first data path. Therefore, the task manager 300 may repeatedly configure the first data path so that as many neural cores 100 as needed for computation can be used regardless of the physical number of the actual neural cores 100. That is, the neural processor 1000 in accordance with some embodiments may configure data paths in an infinite length even with a small number of neural cores 100.

In summary, the task manager 300 may configure the first data path by controlling the controllable ports Ctrlb_port included in the core array CoA. As described above, the first data path may include a path through which data move in the first direction from the first memory 400_1 to the fourth L0 memory 120_4 by way of the first L0 memory 120_1, the second L0 memory 120_2, and the third L0 memory 120_3, and a path through which data move in the second direction from the fourth L0 memory 120_4 to the first memory 400_1 by way of the third L0 memory 120_3, the second L0 memory 120_2 and the first L0 memory 120_1.

Figure 9:
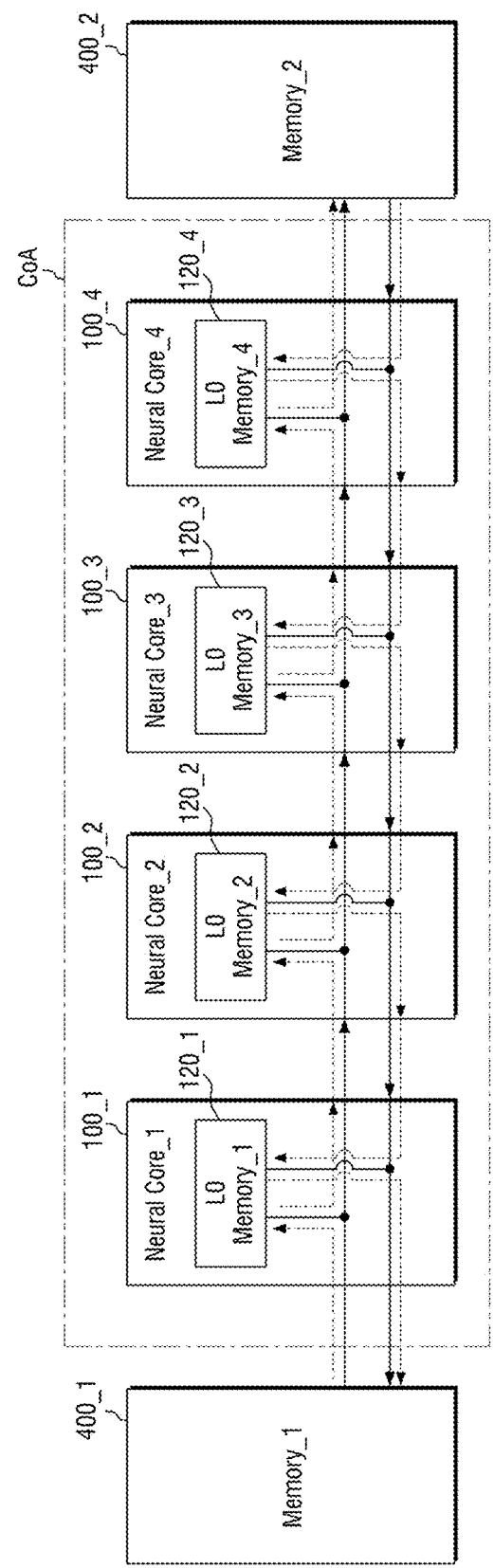
FIG. 9 is an example diagram for illustrating a second data path and a third data path in accordance with some embodiments of the disclosure.

FIG. 9 is an example diagram for illustrating a second data path and a third data path in accordance with some embodiments of the disclosure.

Referring to FIGS. 6, 7, and 9, the neural processor 1000 may include a first memory 400_1, a second memory 400_2, and a core array CoA. The core array CoA may include a first neural core 100_1, a second neural core 100_2, a third neural core 100_3, and a fourth neural core 100_4, and each neural core may include an L0 memory. The first memory 400_1 and the second memory 400_2 may be the same memory or different memories.

According to some embodiments, the task manager 300 may configure a second data path in the first direction by controlling the controllable ports Ctrlb_port, so that data are provided from the first memory 400_1 to the first L0 memory 120_1, from the first L0 memory 120_1 to the second L0 memory 120_2, from the second L0 memory 120_2 to the third aL0 memory 120_3, from the third L0 memory 120_3 to the fourth L0 memory 120_4, and from the fourth L0 memory 120_4 to the second memory 400_2.

In some embodiments, the task manager 300 may provide data in the first direction from the first memory 400_1 toward the second memory 400_2 by controlling the controllable ports Ctrlb_port, so that data are computed by way of the first neural core 100_1 through the fourth neural core 100_4. For example, it is assumed that the data provided to each L0 memory 120 are computed by a processing unit included in each neural core 100.

If described in terms of data computation, the task manager 300 may control to provide first data outputted from the first memory 400_1 to the first L0 memory 120_1. The first neural core 100_1 may generate second data by computing the first data. The task manager 300 may control to provide the second data to the second L0 memory 120_2. The second neural core 100_2 may generate third data by computing the second data. The task manager 300 may control to provide the third data to the third L0 memory 120_3. The third neural core 100_3 may generate fourth data by computing the third data. The task manager 300 may control to provide the fourth data to the fourth L0 memory 120_4. The fourth neural core 100_4 may generate fifth data by computing the fourth data. The task manager 300 may provide the fifth data to the second memory 400_2 and control the second memory 400_2 to store the fifth data.

Further, the task manager 300 may configure a third data path in the second direction by controlling the controllable ports Ctrlb_port, so that data are provided from the second memory 400_2 to the fourth L0 memory 120_4, from the fourth L0 memory 120_4 to the third L0 memory 120_3, from the third L0 memory 120_3 to the second L0 memory 120_2, from the second L0 memory 120_2 to the first L0 memory 120_1, and from the first L0 memory 120_1 to the first memory 400_1.

In some embodiments, the task manager 300 may provide data in the second direction from the second memory 400_2 toward the first memory 400_1 by controlling the controllable ports Ctrlb_port, so that data are computed by way of the fourth neural core 100_4 through the first neural core 100_1.

If described in terms of data computation, the task manager 300 may control to provide sixth data outputted from the second memory 400_2 to the fourth L0 memory 120_4. The fourth neural core 100_4 may generate seventh data by computing the sixth data. The task manager 300 may control to provide the seventh data to the third L0 memory 120_3. The third neural core 100_3 may generate eighth data by computing the seventh data. The task manager 300 may control to provide the eighth data to the second L0 memory 120_2. The second neural core 100_2 may generate ninth data by computing the eighth data. The task manager 300 may control to provide the ninth data to the first L0 memory 120_1. The first neural core 100_1 may generate tenth data by computing the ninth data. The task manager 300 may provide the tenth data to the first memory 400_1 and control the first memory 400_1 to store the tenth data.

In summary, the task manager 300 may configure the second data path and the third data path by controlling the controllable ports Ctrlb_port included in the core array CoA. The second data path may be a path through which data move in the first direction from the first memory 400_1 to the second memory 400_2 by way of the first L0 memory 120_1, the second L0 memory 120_2, the third L0 memory 120_3, and the fourth L0 memory 120_4. In addition, the third data path may be a path through which data move in the second direction from the second memory 400_2 to the first memory 400_1 by way of the fourth L0 memory 120_4, the third L0 memory 120_3, the second L0 memory 120_2, and the first L0 memory 120_1.

Figure 10:
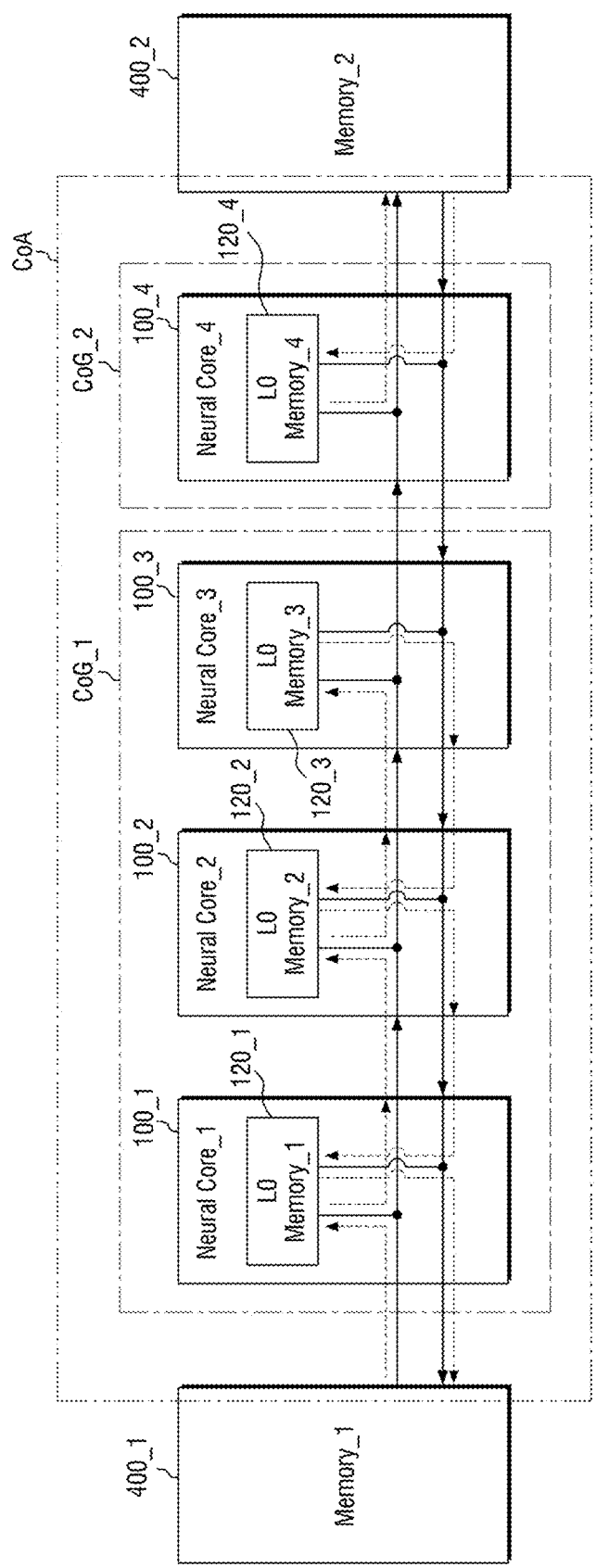
FIG. 10 is an example diagram for illustrating a fourth data path and a fifth data path in accordance with some embodiments of the disclosure.

FIG. 10 is an example diagram for illustrating a fourth data path and a fifth data path in accordance with some embodiments of the disclosure.

Referring to FIGS. 6, 7, and 10, the neural processor 1000 may include a core array CoA, a first memory 400_1, and a second memory 400_2. The core array CoA may include a first computation group CoG_1 and a second computation group CoG_2. The first computation group CoG_1 and the second computation group CoG_2 may execute different programs, applications, or computations. The first computation group CoG_1 may include a first neural core 100_1, a second neural core 100_2, and a third neural core 100_3, and the second computation group CoG_2 may include a fourth neural core 100_4. Each neural core may include an L0 memory. The first memory 400_1 and the second memory 400_2 may be the same memory or different memories.

According to some embodiments, the task manager 300 may configure a fourth data path by controlling the controllable ports Ctrlb_port. The fourth data path may be a data path for the first computation group CoG_1. The task manager 300 may configure the fourth data path by configuring a data movement path in a first direction in which data are provided from the first memory 400_1 to the first L0 memory 120_1, from the first L0 memory 120_1 to the second L0 memory 120_2, and from the second L0 memory 120_2 to the third L0 memory 120_3, and a data movement path in a second direction in which data are provided from the third L0 memory 120_3 to the second L0 memory 120_2, from the second L0 memory 120_2 to the first L0 memory 120_1, and from the first L0 memory 120_1 to the first memory 400_1.

In some embodiments, the task manager 300 may configure the fourth data path by controlling the controllable ports Ctrlb_port, so that data are computed by way of the first neural core 100_1 through the third neural core 100_3, and the data computed in the third neural core 100_3 are computed again by way of the second neural core 100_2 and the first neural core 100_1 and stored in the first memory 400_1. For example, it is assumed that the data provided to each L0 memory 120 are computed by a processing unit included in each neural core 100.

If described in terms of data computation, the task manager 300 may control to provide first data outputted from the first memory 400_1 to the first L0 memory 120_1. The first neural core 100_1 may generate second data by computing the first data. The task manager 300 may control to provide the second data to the second L0 memory 120_2. The second neural core 100_2 may generate third data by computing the second data. The task manager 300 may control to provide the third data to the third L0 memory 120_3. The third neural core 100_3 may generate fourth data by computing the third data. The task manager 300 may control to provide the fourth data to the second L0 memory 120_2. The second neural core 100_2 may generate fifth data by computing the fourth data. The task manager 300 may control to provide the fifth data to the first L0 memory 120_1. The first neural core 100_1 may generate sixth data by computing the fifth data. The task manager 300 may control to store the sixth data in the first memory 400_1.

Further, the task manager 300 may configure a fifth data path by controlling the controllable ports Ctrlb_port. The fifth data path may be a data path for the second computation group CoG_2. The task manager 300 may configure the fifth data path by configuring a data movement path in the second direction in which data are provided from the second memory 400_2 to the fourth L0 memory 120_4, and a data movement path in the first direction in which data are provided from the fourth L0 memory 120_4 to the second memory 400_2 again.

In some embodiments, the task manager 300 may configure the fifth data path by controlling the controllable ports Ctrlb_port, so that the data provided from the second memory 400_2 are computed in the fourth neural core 100_4 and stored again in the second memory 400_2. For example, it is assumed that the data provided to each L0 memory 120 are computed by a processing unit included in each neural core 100.

If described in terms of data computation, the task manager 300 may control to provide seventh data outputted from the second memory 400_2 to the fourth L memory 120_4. The fourth neural core 100_4 may generate eighth data by computing the seventh data. The task manager 300 may control to store the eighth data in the second memory 400_2.

In summary, the first computation group CoG_1 and the second computation group CoG_2 included in the core array CoA may have different data paths. That is, the task manager 300 may configure the fourth data path of the first computation group CoG_1 and the fifth data path of the second computation group CoG_2 by controlling the controllable ports Ctrlb_port included in the core array CoA. The fourth data path may include a path through which data are moved in the first direction from the first memory 400_1 through the first L0 memory 120_1 and the second L0 memory 120_2, to the third L0 memory 120_3, and a path through which data are moved in the second direction from the third L0 memory 120_3 through the second L0 memory 120_2 and the first L0 memory 120_1, to the first memory 400_1. In addition, the fifth data path may include a path through which data are moved in the second direction from the second memory 400_2 to the fourth L0 memory 120_4, and a path through which data are moved in the first direction from the fourth L0 memory 120_4 to the second memory 400_2.

Figure 11:
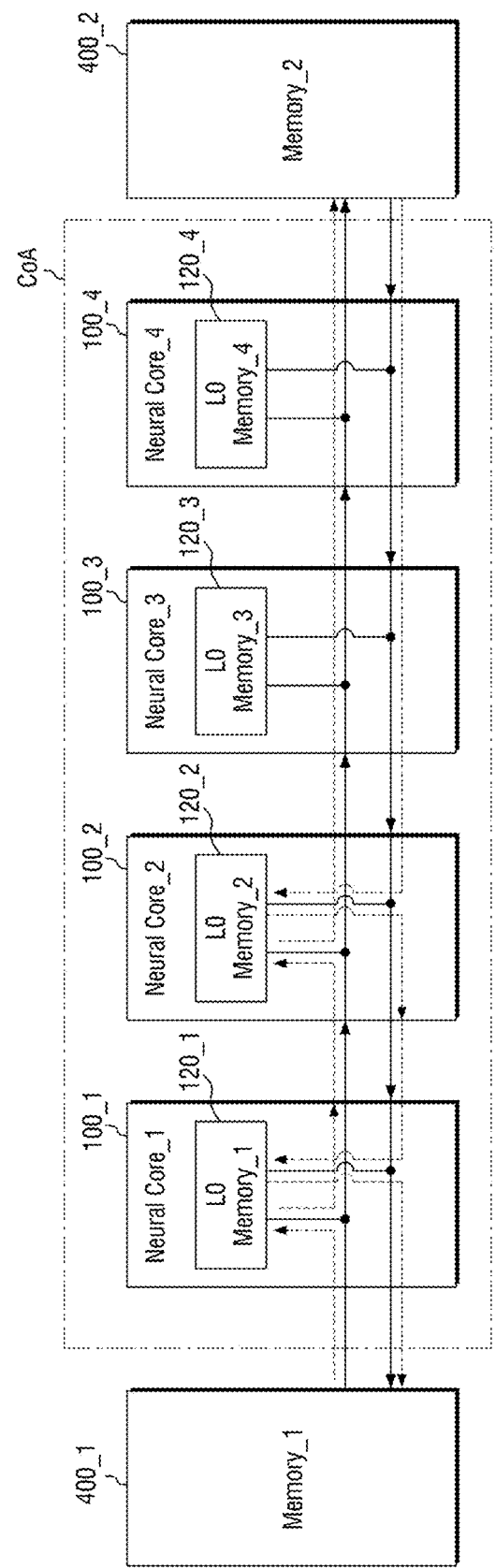
FIG. 11 is an example diagram for illustrating a sixth data path and a seventh data path in accordance with some embodiments of the disclosure.

FIG. 11 is an example diagram for illustrating a sixth data path and a seventh data path in accordance with some embodiments of the disclosure.

Referring to FIGS. 6, 7, and 11, the neural processor 1000 may include a first memory 400_1, a second memory 400_2, and a core array CoA. The core array CoA may include a first neural core 100_1, a second neural core 100_2, a third neural core 100_3, and a fourth neural core 100_4, and each neural core may include an L0 memory. The first memory 400_1 and the second memory 400_2 may be the same memory or different memories.

According to some embodiments, the task manager 300 may configure a sixth data path in the first direction by controlling the controllable ports Ctrlb_port, so that data are provided from the first memory 400_1 to the first L0 memory 120_1, from the first L0 memory 120_1 to the second L0 memory 120_2, and from the second L0 memory 120_2 to the second memory 400_2.

In some embodiments, the task manager 300 may control that data are provided in the first direction from the first memory 400_1 toward the second memory 400_2 but the data are computed only in the first neural core 100_1 and the second neural core 100_2 by controlling the controllable ports Ctrlb_port. For example, it is assumed that the data provided to each L0 memory 120 are computed by a processing unit included in the first neural core 100_1 and the second neural core 100_2.

If described in terms of data computation, the task manager 300 may control to provide first data outputted from the first memory 400_1 to the first L0 memory 120_1. The first neural core 100_1 may generate second data by computing the first data. The task manager 300 may control to provide the second data to the second L0 memory 120_2. The second neural core 100_2 may generate third data by computing the second data. The task manager 300 may provide the third data to the second memory 400_2 and control the second memory 400_2 to store the third data.

According to some embodiments, a part of a first data line D_L1 passing through the first neural core 100_1 and the second neural core 100_2 may be used as a data computation path that allows computation of data to be performed in the first neural core 100_1 and the second neural core 100_2, and the other part of the first data line D_L1 passing through the third neural core 100_3 and the fourth neural core 100_4 may be used as a data bus through which data pass from the second L0 memory 120_2 to the second memory 400_2. In some embodiments, the task manager 300 configures the sixth data path and may use part of the first data line D_L1 as the data computation path and the other part of the first data line D_L1 as the data bus. In this case, the task manager 300 can also minimize the power consumption of the neural processor 1000 by adjusting the power so that the third neural core 100_3 and the fourth neural core 100_4, in which computation is not performed, are not driven.

Furthermore, the task manager 300 may configure the seventh data path in the second direction by controlling the controllable ports Ctrlb_port, so that data are provided from the second memory 400_2 to the second L0 memory 120_2, from the second L0 memory 120_2 to the first L0 memory 120_1, and from the first L0 memory 120_1 to the first memory 400_1.

In some embodiments, the task manager 300 may control that data are provided in the second direction from the second memory 400_2 toward the first memory 400_1 but the data are computed only in the second neural core 100_2 and the first neural core 100_1 by controlling the controllable ports Ctrlb_port. For example, it is assumed that the data provided to each L0 memory 120 are computed by a processing unit included in the first neural core 100_1 and the second neural core 100_2.

If described in terms of data computation, the task manager 300 may control to provide fourth data outputted from the second memory 400_2 to the second L0 memory 120_2. The second neural core 100_2 may generate fifth data by computing the fourth data. The task manager 300 may control to provide the fifth data to the first L0 memory 120_1. The first neural core 100_1 may generate sixth data by computing the fifth data. The task manager 300 may provide the sixth data to the first memory 400_1 and control the first memory 400_1 to store the sixth data.

According to some embodiments, a part of a second data line D_L2 passing through the fourth neural core 100_4 and the third neural core 100_3 may be used as a data bus through which data pass from the second memory 400_2 to the second L0 memory 120_2, and the other part of the second data line D_L2 passing through the second neural core 100_2 and the first neural core 100_1 may be used as a data computation path that allows the computation of data to be performed in the second neural core 100_2 and the first neural core 100_1. In some embodiments, the task manager 300 configures the seventh data path, and may use part of the second data line D_L2 as the data computation path and the other part of the second data line D_L2 as the data bus. In this case, the task manager 300 can also minimize the power consumption of the neural processor 1000 by adjusting the power so that the third neural core 100_3 and the fourth neural core 100_4, in which computation is not performed, are not driven.

According to some embodiments, the task manager 300 can enhance the security of the neural processor 1000 by using only parts of the first data line D_L1 and the second data line D_L2 as the data computation path. Sensitive information such as personal information should be computed and handled only in particular neural cores 100. In this case, the task manager 300 may control data to be computed only in particular neural cores 100 included in the core array CoA, and that the rest of the neural cores 100 cannot check or access the data, by controlling the controllable ports Ctrlb_port. For example, if particular data needs to be handled by the first neural core 100_1 and the second neural core 100_2 only, the task manager 300 may control that the data are provided only to the first L0 memory 120_1 and the second L0 memory 120_2, and may control that the third L0 memory 120_3 and the fourth L0 memory 120_4 cannot check the data, by controlling the controllable ports Ctrlb_port.

In summary, the task manager 300 may configure the sixth data path and the seventh data path by controlling the controllable ports Ctrlb_port included in the core array CoA. The sixth data path may be a path through which data are moved in the first direction from the first memory 400_1 through the first L0 memory 120_1 and the second L0 memory 120_2, to the second memory 400_2. In addition, the seventh data path may be a path through which data are moved in the second direction from the second memory 400_2 through the second L0 memory 120_2 and the first L0 memory 120_1, to the first memory 400_1.

Some examples of the data paths configured by the task manager 300 have been described referring to FIGS. 7 to 11. However, the embodiments of the disclosure are not limited to these examples, and those having ordinary skill in the art of the disclosure may be able to configure data paths that have not been described separately herein by appropriately modifying the data paths without departing from the scope of the disclosure.

According to some embodiments, the neural cores 100 included in the core array CoA are connected in series. If it is necessary to add neural cores 100 to the core array CoA, simple expansion is possible without the need for separate design changes or addition of lines because all of the neural cores 100 included in the core array CoA are connected in series. For example, since new neural cores 100 can be added to the core array CoA by simply connecting the neural cores 100 to be newly added with the first data line D_L1 and the second data line D_L2 in series and connecting the controllable ports Ctrlb_port, there is an advantage of being highly scalable.

According to some embodiments, the task manager 300 may configure various data paths by using the controllable ports Ctrlb_port. In some embodiments, the task manager 300 can configure data paths, and thus can design and reflect appropriate data paths according to a flow of data. That is, the task manager 300 can configure the most optimized data paths according to the type of computations, and thus, unnecessary data movement can be reduced, thereby increasing the computation efficiency of the neural processor 1000.

Figure 12:
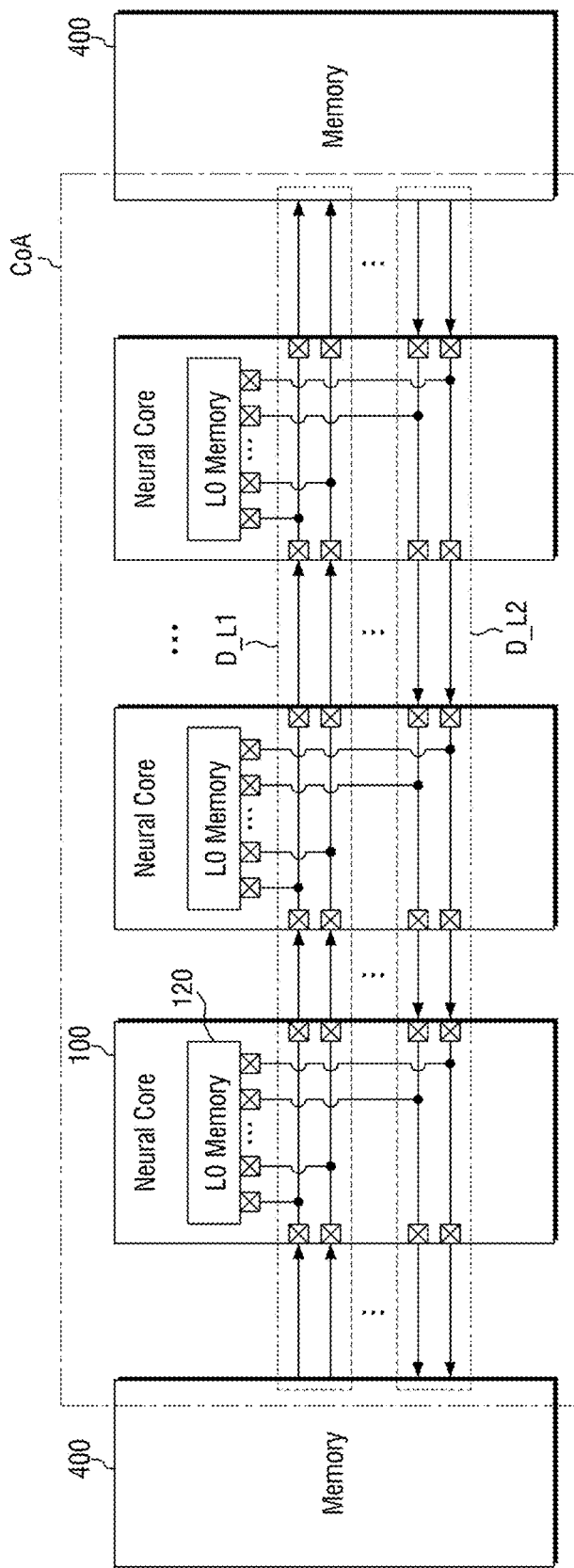
FIG. 12 is a diagram for illustrating data lines and connection lines connecting neural cores and memories included in a neural processor in accordance with some embodiments of the disclosure.

FIG. 12 is a diagram for illustrating data lines and connection lines connecting neural cores and memories included in a neural processor in accordance with some embodiments of the disclosure. For the convenience of description, descriptions that are identical to or similar to those described above will be omitted or simplified.

Referring to FIGS. 6 and 12, the core array CoA may include a plurality of first data lines D_L1 through which data are transmitted in a first direction, and a plurality of second data lines D_L2 through which data are transmitted in a second direction. In some embodiments, the core array CoA can transmit data in both directions.

The core array CoA may include a plurality of neural cores 100 and, the first data lines D_L1, and the second data lines D_L2. The plurality of neural cores 100 may be connected in series with each other via the first data lines D_L1. Further, the plurality of neural cores 100 may be connected in series with each other via the second data lines D_L2. In some embodiments, the plurality of neural cores 100 may have a structure in which they are connected in series with each other by the first data lines D_L1 and the second data lines D_L2.

The first data line D_L1 and the second data line D_L2 may each include a plurality of data lines. In some embodiments, the first data lines D_L1 may include a plurality of data lines through which data are transmitted in the first direction. Also, the second data lines D_L2 may include a plurality of data lines through which data are transmitted in the second direction.

In some embodiments, the core array CoA may include a plurality of connection lines connecting the first data line D_L1 and the L0 memory 120 and a plurality of connection lines connecting the second data line D_L2 and the L0 memory 120. As described above, since each of the first data lines D_L1 and the second data lines D_L2 includes a plurality of data lines, the connection lines connecting the first data line D_L1 and the L0 memory 120 may also be configured in plurality, and the connection lines connecting the second data line D_L2 and the L0 memory 120 may also be configured in plurality.

According to some embodiments, the core array CoA may include controllable ports Ctrlb_port that can be controlled on/off by software or firmware. The controllable ports Ctrlb_port may be installed on the first data lines D_L, the second data lines D_L2, and the connection lines, and may set data movement paths.

According to some embodiments, the task manager 300 may turn on/off at least some of the plurality of data lines included in the first data lines D_L1 by controlling the controllable ports Ctrlb_port. For example, the task manager 300 may turn off some of the plurality of data lines included in the first data lines D_L1 by controlling the controllable ports Ctrlb_port. For another example, the task manager 300 may turn on all of the plurality of data lines included in the first data lines D_L1 by controlling the controllable ports Ctrlb_port.

Likewise, the task manager 300 may turn on/off at least some of the plurality of data lines included in the second data lines D_L2 by controlling the controllable ports Ctrlb_port. For example, the task manager 300 may turn off some of the plurality of data lines included in the second data lines D_L2 by controlling the controllable ports Ctrlb_port. For another example, the task manager 300 may turn on all of the plurality of data lines included in the second data lines D_L2 by controlling the controllable ports Ctrlb_port.

According to some embodiments, the task manager 300 can prevent unnecessary power consumption by controlling at least some of the plurality of data lines included in the first data lines D_L1 and the second data lines D_L2 according to bandwidths of the data. For example, if a relatively high bandwidth is required for data transmission, the task manager 300 may control the controllable ports Ctrlb_port to turn on all of the plurality of data lines included in the first data lines D_L1 and the second data lines D_L2 and use all of the plurality of data lines for data transmission. If a relatively low bandwidth is required for data transmission, the task manager 300 may control the controllable ports Ctrlb_port to turn on some of the plurality of data lines included in the first data line D_L1 and the second data line D_L2 and turn off the rest of the data lines, thereby reducing unnecessary power consumption. In some embodiments, the task manager 300 can minimize waste of power consumption by turning off unnecessary data transmission lines according to the bandwidths required for data transmission. Further reference is made to FIGS. 13A and 13B for an illustrative description.

Figure 13A:
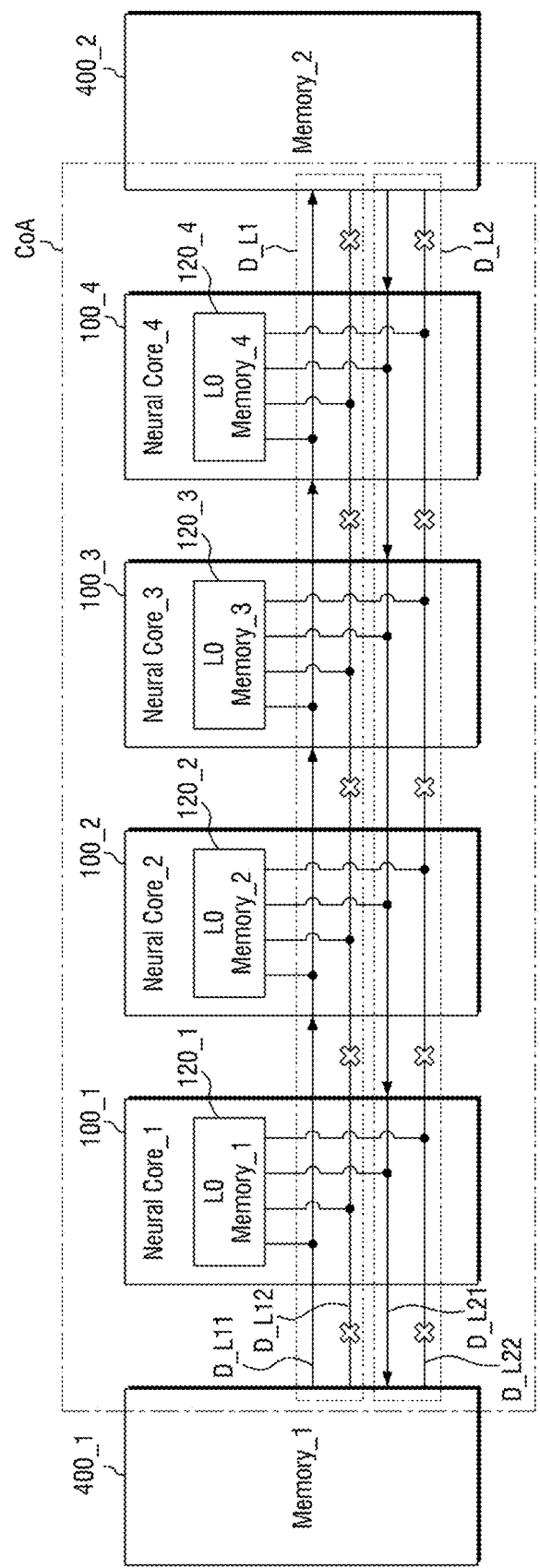
FIGS. 13A and 13B are example diagrams for illustrating on/off of data lines in accordance with some embodiments of the disclosure.
Figure 13B:
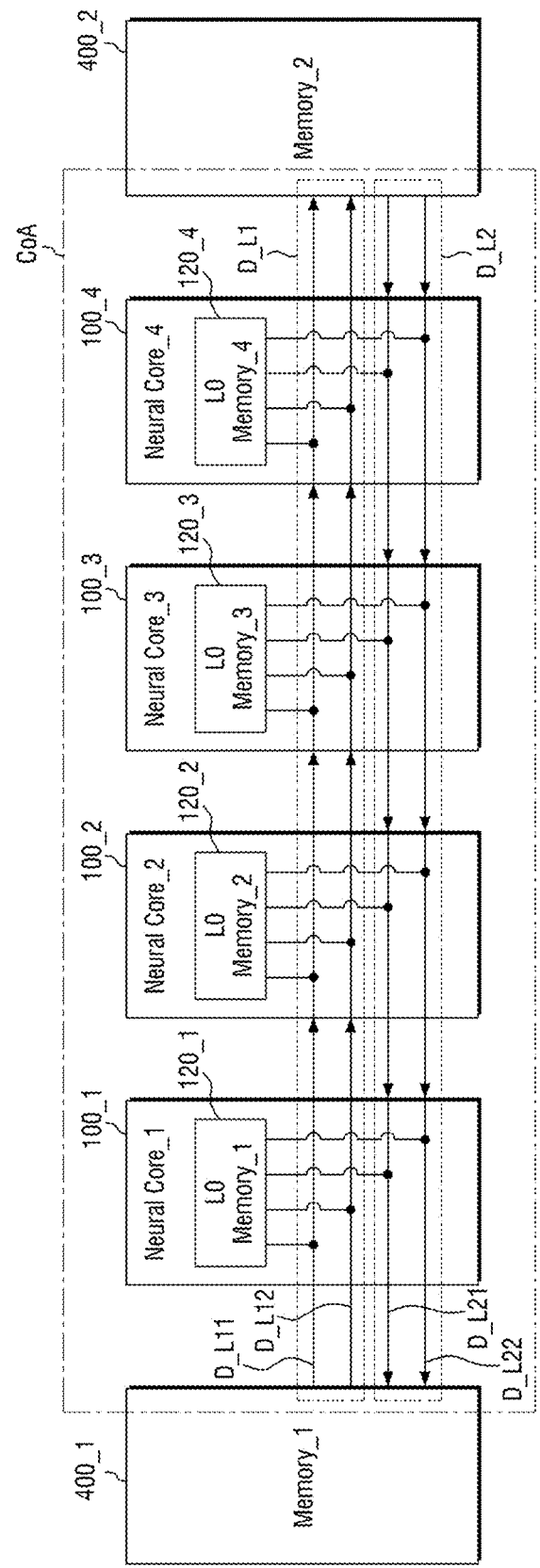

FIGS. 13A and 13B are example diagrams for illustrating on/off of data lines in accordance with some embodiments of the disclosure. FIG. 13A describes a case where the bandwidth required for data transmission is relatively low, and FIG. 13B describes a case where the bandwidth required for data transmission is relatively high.

Referring to FIGS. 6, 12, and 13A, the neural processor 1000 may include a first memory 400_1, a second memory 400_2, and a core array CoA. The core array CoA may include a first neural core 100_1, a second neural core 100_2, a third neural core 100_3, and a fourth neural core 100_4, and each neural core may include an L0 memory. In some embodiments, the first neural core 100_1 may include a first L0 memory 120_1, the second neural core 100_2 may include a second L0 memory 120_2, the third neural core 100_3 may include a third L0 memory 120_3, and the fourth neural core 100_4 may include a fourth L0 memory 120_4. The first memory 400_1 and the second memory 400_2 may be the same memory or different memories.

In addition, the core array CoA may include first data lines D_L1 and second data lines D_L2. The first data lines D_L1 may include a (1-1)th data line D_L11 and a (1-2)th data line D_L12. Further, the second data line D_L2 may include a (2-1)th data line D_L21 and a (2-2)th data line D_L22.

The (1-1)th data line D_L11, the (1-2)th data line D_L12, the (2-1)th data line D_L21, and the (2-2)th data line D_L22 may be referred to respectively as a (1-1)th data line circuit, a (1-2)th data line circuit, a (2-1)th data line circuit, and a (2-2)th data line circuit. However, for the sake of convenience, the terms are respectively unified as a (1-1)th data line, a (1-2)th data line, a (2-1)th data line, and a (2-2)th data line. In addition, each of the (1-1)th data line D_L11, the (1-2)th data line D_L12, the (2-1)th data line D_L21, and the (2-2)th data line D_L22 may be implemented as a circuit or circuitry.

According to some embodiments, the task manager 300 may turn off some of the data lines included in the first data lines D_L1 and the second data lines D_L2 by controlling the controllable ports Ctrlb_port. For example, the task manager 300 may turn off the (1-2)th data line D_L12 included in the first data lines D_L1 and the (2-2)th data line D_L22 included in the second data lines D_L2 by controlling the controllable ports Ctrlb_port. In some embodiments, the task manager 300 may configure data paths to enable data transmission by using only the (1-1)th data line D_L11 and the (2-1)th data line D_L21 by controlling the controllable ports Ctrlb_port. That is, the task manager 300 can reduce unnecessary power consumption by turning off the (1-2)th data line D_L12 and the (2-2)th data line D_L22 as needed.

Referring further to FIG. 13B, the task manager 300 may turn on all the data lines included in the first data lines D_L1 and the second data lines D_L2 by controlling the controllable ports Ctrlb_port. For example, the task manager 300 may turn on the (1-1)th data line D_L11 and the (1-2)th data line D_L12 included in the first data lines D_L1, and the (2-1)th data line D_L21 and the (2-2)th data line D_L22 included in the second data lines D_L2 by controlling the controllable ports Ctrlb_port. In some embodiments, the task manager 300 may configure data paths to enable data transmission by using all of the (1-1)th data line D_L11, the (1-2)th data line D_L12, the (2-1)th data line D_L21, and the (2-2)th data line D_L22 by controlling the controllable ports Ctrlb_port. That is, the task manager 300 can maximize transmission performance by turning on all of the (1-1)th data line D_L11, the (1-2)th data line D_L12, the (2-1)th data line D_L21, and the (2-2)th data line D_L22 as needed.

Figure 14:
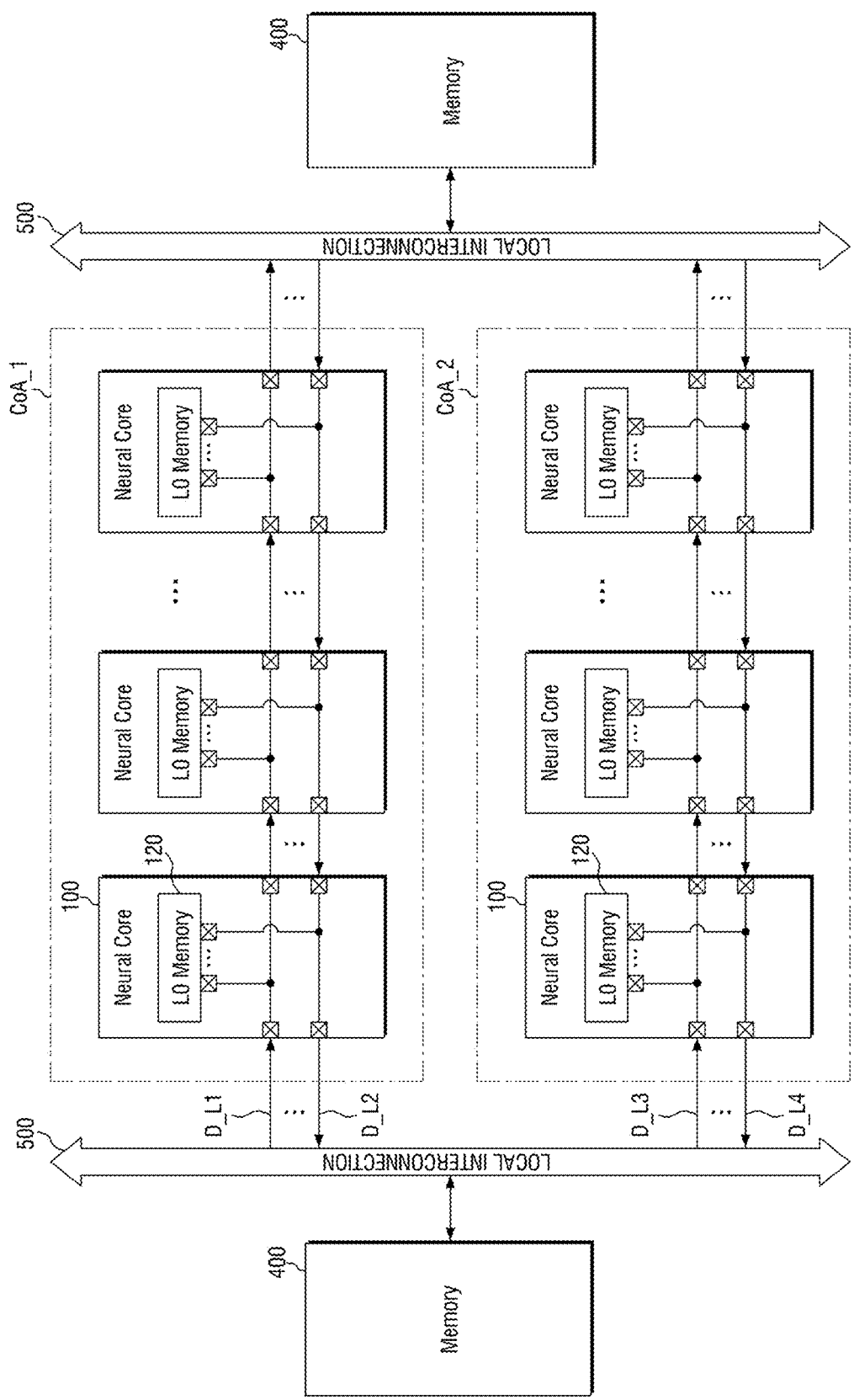
FIG. 14 is a diagram for illustrating data lines and connection lines connecting neural cores and memories included in a neural processor in accordance with some embodiments of the disclosure.

FIG. 14 is a diagram for illustrating data lines and connection lines connecting neural cores and memories included in a neural processor in accordance with some embodiments of the disclosure. For the convenience of description, descriptions that are identical to or similar to those described above will be omitted or simplified.

Referring to FIGS. 6 and 14, the core array CoA may include a first core array CoA_1 and a second core array CoA_2. The first core array CoA_1 may include a first data line D_L1 through which data are transmitted in a first direction. Further, the first core array CoA_1 may include a second data line D_L2 through which data are transmitted in a second direction. In some embodiments, the first core array CoA_1 may be able to transmit data in both directions.

Also, the second core array CoA_2 may include a third data line D_L3 through which data are transmitted in the first direction. In addition, the second core array CoA_2 may include a fourth data line D_L4 through which data are transmitted in the second direction. In some embodiments, the second core array CoA_2 may be able to transmit data in both directions. In this case, the third data line D_L3 and the fourth data line D_L4 may be referred to respectively as a third data line circuit and a fourth data line circuit. However, for the sake of convenience, the terms are respectively unified as a third data line and a fourth data line. In addition, each of the third data line D_L3 and the fourth data line D_L4 may be implemented as a circuit or circuitry.

The first core array CoA_1 and the second core array CoA_2 may be the core arrays CoA described with reference to FIGS. 7 to 13B.

The memory 400 may be connected to a local interconnection 500. In addition, the first core array CoA_1 may be connected to the local interconnection 500. Moreover, the second core array CoA_2 may be connected to the local interconnection 500. In some embodiments, data outputted from the memory 400 may be provided to the first core array CoA_1 and/or the second core array CoA_2 via the local interconnection 500. Further, data outputted from the first core array CoA_1 may be provided to the memory 400 and/or the second core array CoA_2 via the local interconnection 500. Moreover, data outputted from the second core array CoA_2 may be provided to the memory 400 and/or the first core array CoA_1 via the local interconnection 500.

The local interconnection 500 may connect at least one core array CoA, the core global 200, and the task manager 300 to one another. The local interconnection 500 may be a path through which data move between the at least one core array CoA, the memory 400, the core global 200, and the task manager 300. The local interconnection 500 may be connected to the global interconnection 6000 of FIG. 3 and transmit data to the global interconnection 6000.

That is, the neural processor 1000 may include the memory 400 and the plurality of core arrays CoA, and data movement may occur between the memory 400 and the plurality of core arrays CoA via the local interconnection 500. In addition, data movement between the plurality of core arrays CoA may also be performed via the local interconnection 500.

According to some embodiments, each of the first data line D_L1 through the fourth data line D_L4 may include a plurality of data lines. For example, a description will be provided assuming a case in which the first data line D_L1 includes a (1-1)th data line and a (1-2)th data line. According to some embodiments, the task manager 300 may control on/off of the (1-1)th data line and the (1-2)th data line according to bandwidths for transmitting data. If the bandwidth of the local interconnection 500 is greater than the bandwidth of the (1-1)th data line, a latency may increase due to a bottleneck when data are provided from the local interconnection 500 to the (1-1)th data line. Therefore, in this case, the task manager 300 may turn on both the (1-1)th data line and the (1-2)th data line by controlling the controllable ports Ctrlb_port. If both the (1-1)th data line and the (1-2)th data line are turned on, the bottleneck occurring in the local interconnection 500 can be minimized, and thus latency can be reduced accordingly.

On the other hand, if the bandwidth of the local interconnection 500 is smaller than the bandwidth of the (1-1)th data line, no bottleneck may occur even if data are provided from the local interconnection 500 to the (1-1)th data line. In this case, the task manager 300 may turn on the (1-1)th data line and turn off the (1-2)th data line by controlling the controllable ports Ctrlb_port. Through this, power consumption in the neural processor 1000 can be minimized without affecting latency, and efficiency can thus be maximized.

In some embodiments, the task manager 300 may control at least some of the plurality of data lines included in the first data line D_L1 and the second data line D_L2 according to the bandwidth of the local interconnection 500. Through this, the efficiency of the neural processor 1000 in terms of power and latency can be maximized.

Figure 15:
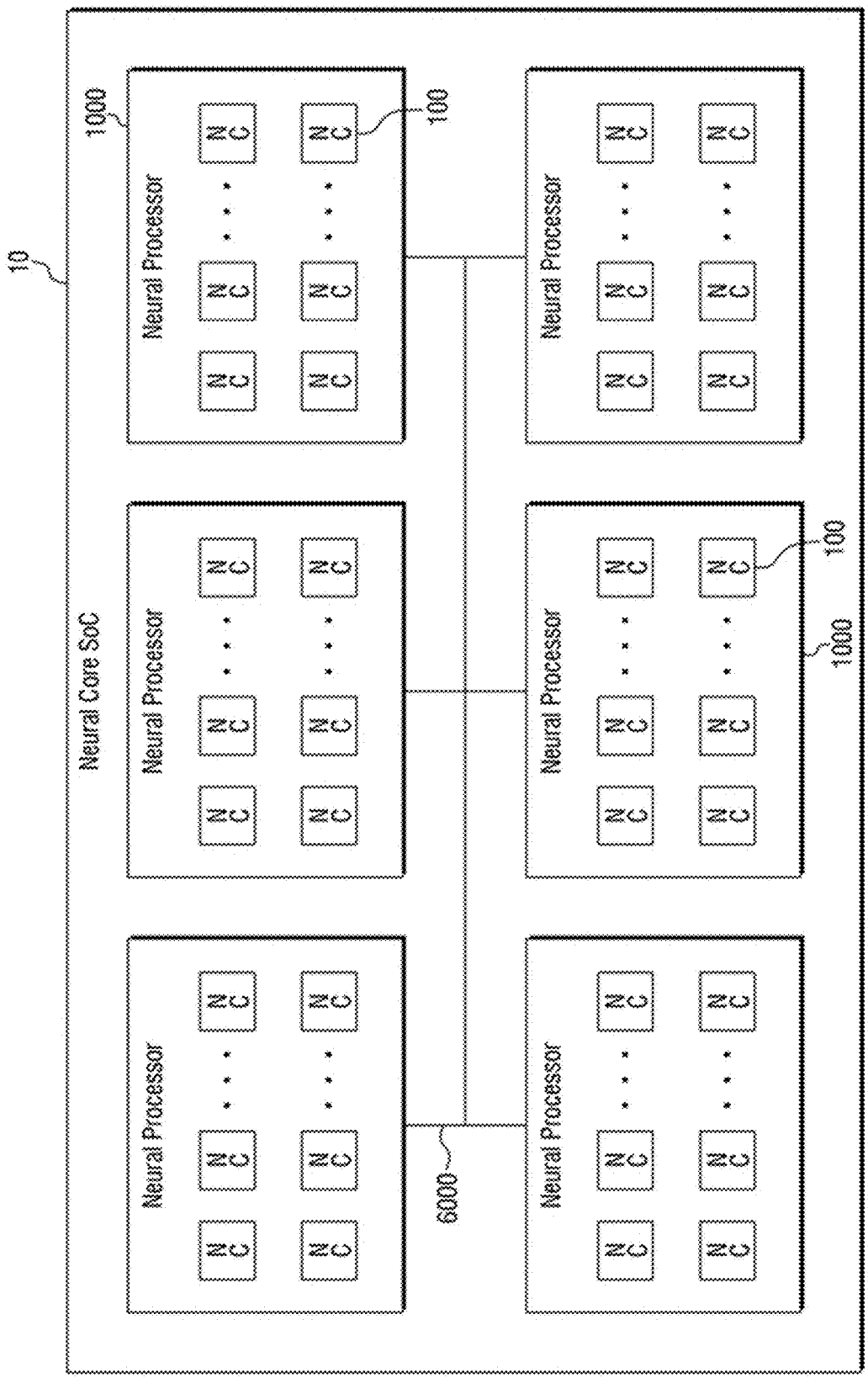
FIG. 15 is a diagram for illustrating a hierarchical structure of a neural processing device in accordance with some embodiments of the disclosure.

FIG. 15 is a diagram for illustrating a hierarchical structure of a neural processing device in accordance with some embodiments of the disclosure.

Referring to FIG. 15, the neural core SoC 10 may include at least one neural processor 1000. The neural processors 1000 may transmit data to each other via the global interconnection 6000.

Each of neural processors 1000 may include at least one neural core 100. The neural core 100 may be a unit of processing optimized for deep learning computation tasks. The neural core 100 may be a unit of processing corresponding to one operation of deep learning computation tasks. In some embodiments, a deep learning computation task can be represented by a sequential or parallel combination of multiple operations. Each of neural cores 100 may be a unit of processing capable of processing one operation, and may be a minimum computation unit that can be considered for scheduling from the viewpoint of a compiler.

The neural processing device in accordance with the embodiment may configure scales of the minimum computation unit considered from the viewpoint of compiler scheduling and the hardware unit of processing to be the same, so that fast and efficient scheduling and computation tasks can be performed.

That is, if a unit of processing into which hardware can be divided is too large compared to computation tasks, inefficiency of the computation tasks may occur in driving the unit of processing. Conversely, it is not appropriate to schedule a unit of processing that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware unit of processing to be similar in the embodiment, it is possible to simultaneously satisfy the fast scheduling of computation tasks and the efficient execution of the computation tasks without wasting hardware resources.

Figure 16:
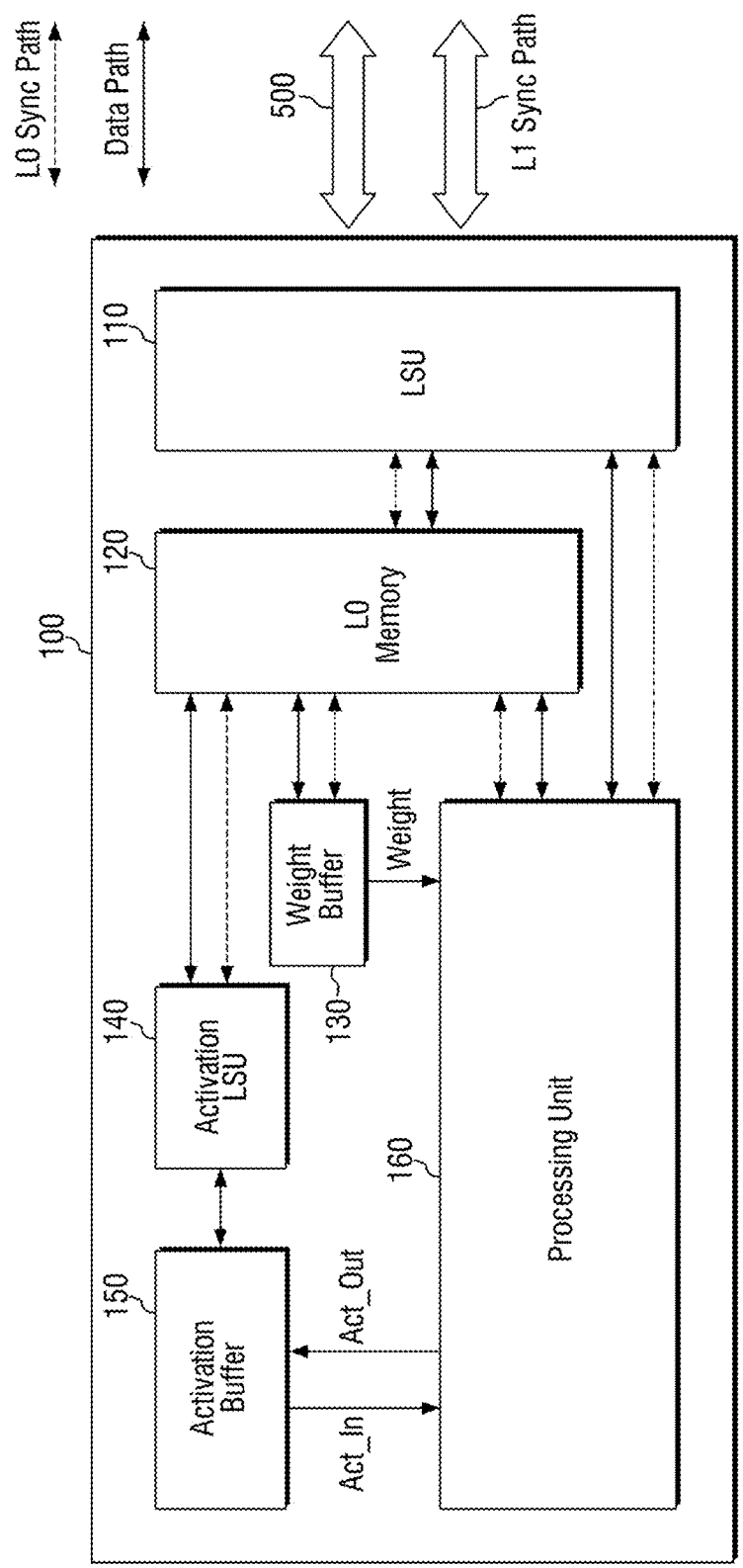
FIG. 16 is a block diagram for illustrating the neural core of FIG. 6 in detail.

FIG. 16 is a block diagram for illustrating the neural core of FIG. 6 in detail.

Referring to FIG. 16, the neural core 100 may include a load/store unit (LSU) 110, an L0 memory 120, a weight buffer 130, an activation LSU 140, an activation buffer 150, and a processing unit 160.

The LSU 110 may receive at least one of data, control signals, or synchronization signals from the outside via the local interconnection 500 and the L1 sync path. The LSU 110 may transmit at least one of the data, the control signals, or the synchronization signals received to the L0 memory 120. Similarly, the LSU 110 may transfer at least one of the data, the control signals, or the synchronization signals to the outside via the local interconnection 500 and the L1 sync path. In this case, the LSU 110 may be referred to as an LSU circuit, but for the sake of convenience, the terms are unified as an LSU. In addition, the LSU 110 may be implemented as a circuit or circuitry.

Figure 17:
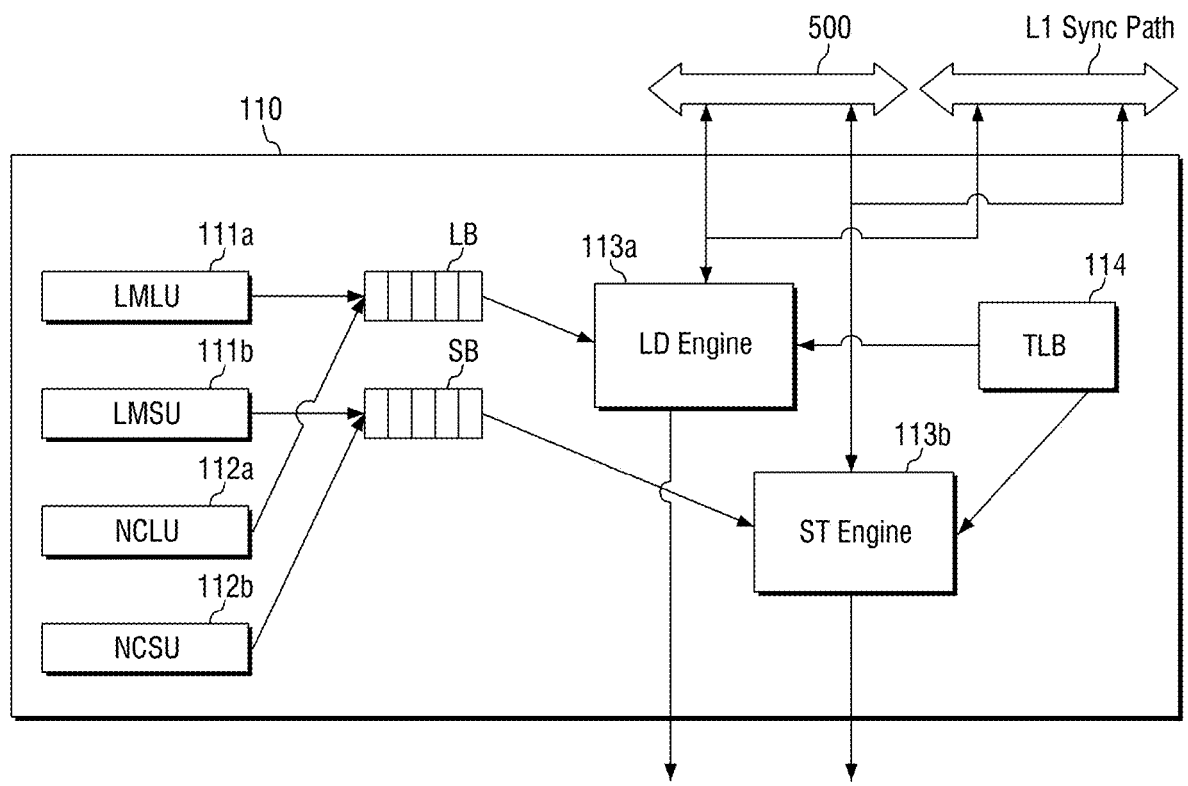
FIG. 17 is a block diagram for illustrating the LSU of FIG. 16 in detail.

FIG. 17 is a block diagram for illustrating the LSU of FIG. 16 in detail.

Referring to FIG. 17, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, each of the local memory load unit 11a, the local memory store unit 111b, the neural core load unit 112a, the neural core store unit 112b, the load engine 113a, and the store engine 113b may be implemented as a circuit or circuitry.

The local memory load unit 11a may fetch a load instruction for the L0 memory 120 and issue the load instruction. When the local memory load unit 11a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 500.

In some embodiments, the load engine 113a may quickly find the data by using a translation table of a logical address and a physical address that has been used recently in the translation lookaside buffer 114. If the logical address of the load engine 113a is not in the translation lookaside buffer 114, the address translation information may be found in another memory.

The store engine 113b may receive the memory access request and retrieve data via the local interconnection 500. In some embodiments, the store engine 113b may quickly find the data by using a translation table of a logical address and a physical address that has been used recently in the translation lookaside buffer 114. If the logical address of the store engine 113b is not in the translation lookaside buffer 114, the address translation information may be found in another memory.

The load engine 113a and the store engine 113b may send synchronization signals to the L1 sync path. In some embodiments, the synchronization signal may indicate that the task has been completed.

Referring to FIG. 16 again, the L0 memory 120 is a memory located inside the neural core 100, and may receive all input data required for the tasks by the neural core 100 from the outside and store the input data temporarily. In addition, the L0 memory 120 may temporarily store the output data calculated by the neural core 100 for transmission to the outside.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In some embodiments, the L memory 120 may exchange data with each of a processing element (PE) array 163 and a vector unit 164. The L0 memory 120 may be a memory corresponding to the level of the neural core. In this case, the L0 memory 120 may be a private memory of the neural core that is not shared.

The L0 memory 120 may be a memory corresponding to the level of the neural core. In this case, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring the weight.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In some embodiments, the activation LSU 140 may perform both load tasks and store tasks of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply the input activation Act_In by a weight, and then add it to generate an output activation Act_Out.

Figure 18:
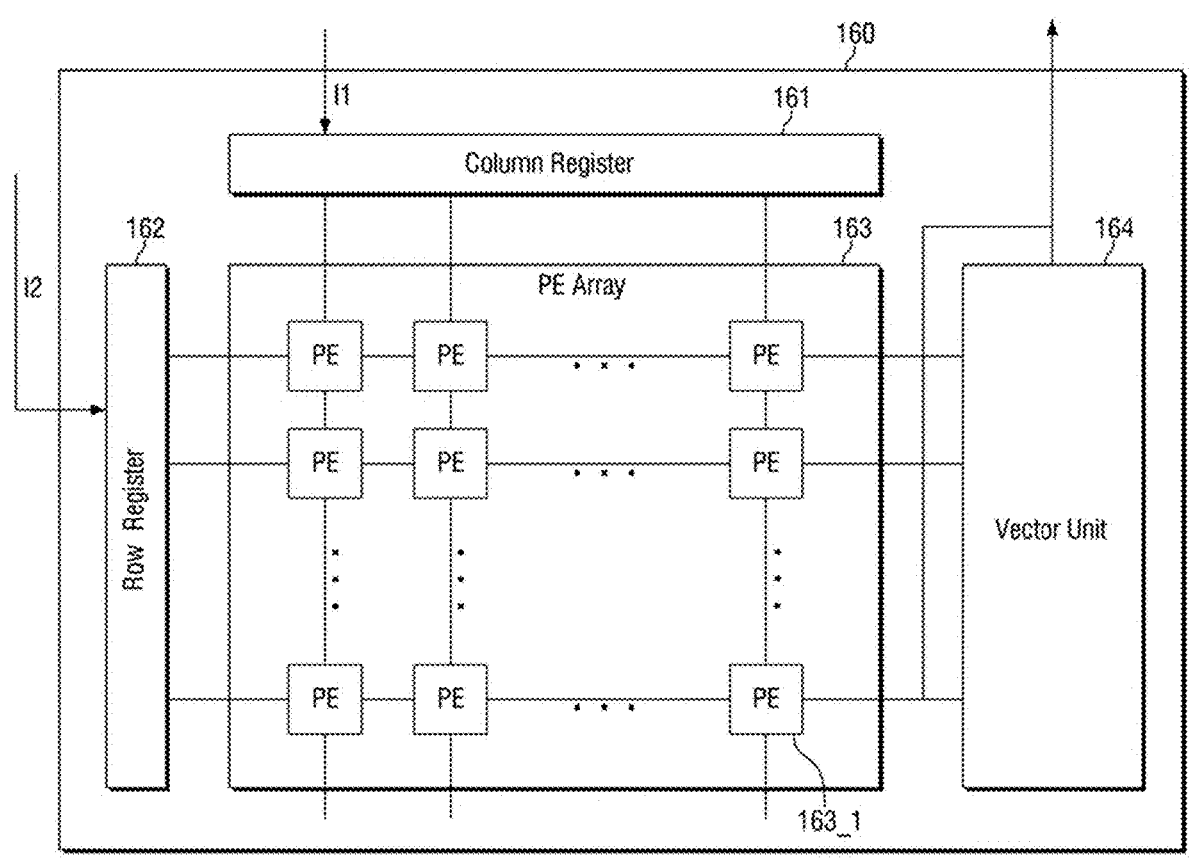
FIG. 18 is a block diagram for illustrating the processing unit of FIG. 16 in detail.

FIG. 18 is a block diagram for illustrating the processing unit of FIG. 16 in detail.

Referring to FIG. 16 and FIG. 18, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element (PE) 163_1. The processing elements 163_1 may be aligned with each other so that each of the processing elements 163_1 may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In some embodiments, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 19:
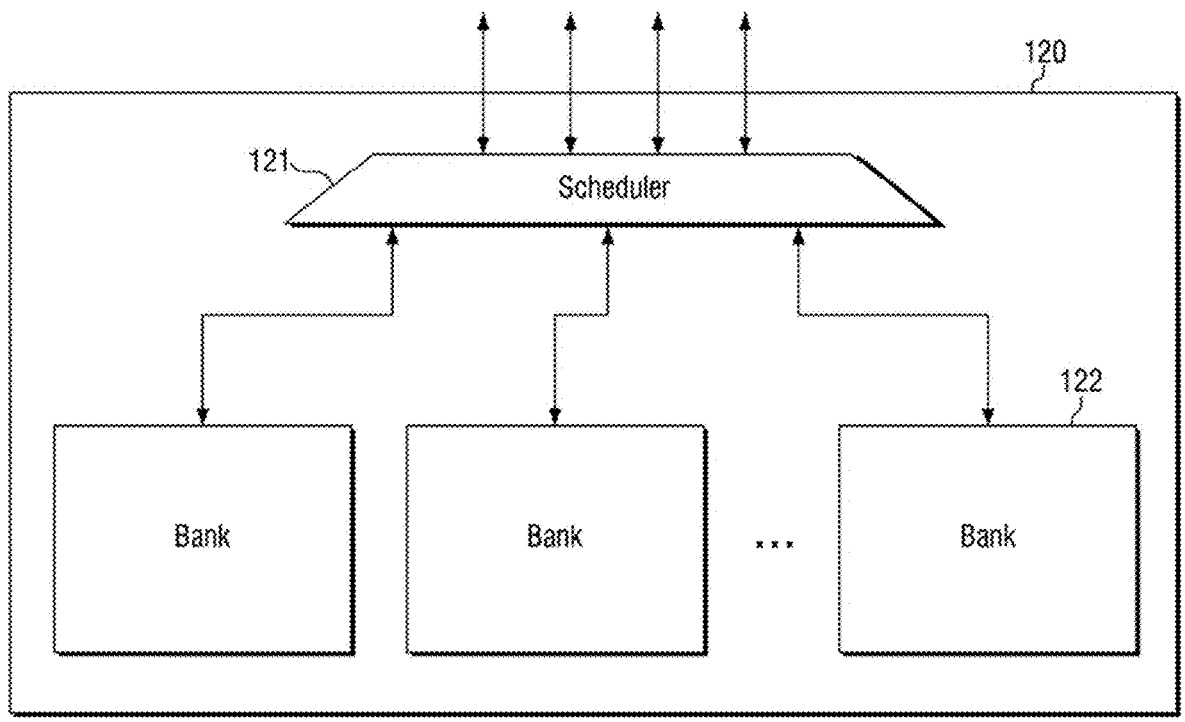
FIG. 19 is a block diagram for illustrating the L0 memory of FIG. 16 in detail.

FIG. 19 is a block diagram for illustrating the L0 memory of FIG. 16 in detail.

Referring to FIG. 19, the L0 memory 120 may include a scheduler 121 and one or more local memory banks 122.

When data are stored in the L0 memory 120, the scheduler 121 may receive data from the load engine 113*a*. In this case, the local memory bank 122 may be allocated for the data in a round-robin manner. Accordingly, data may be stored in any one of the local memory banks 122.

In contrast to this, when data are loaded from the L0 memory 120, the scheduler 121 may receive the data from the local memory bank 122 and transmit the data to the store engine 113*b*. The store engine 113*b* may store the data in the outside through the local interconnection 500. In this case, the scheduler 121 may be referred to as a scheduler circuit, but for the sake of convenience, the terms are unified as a scheduler. In addition, the scheduler 121 may be implemented as a circuit or circuitry.

Figure 20:
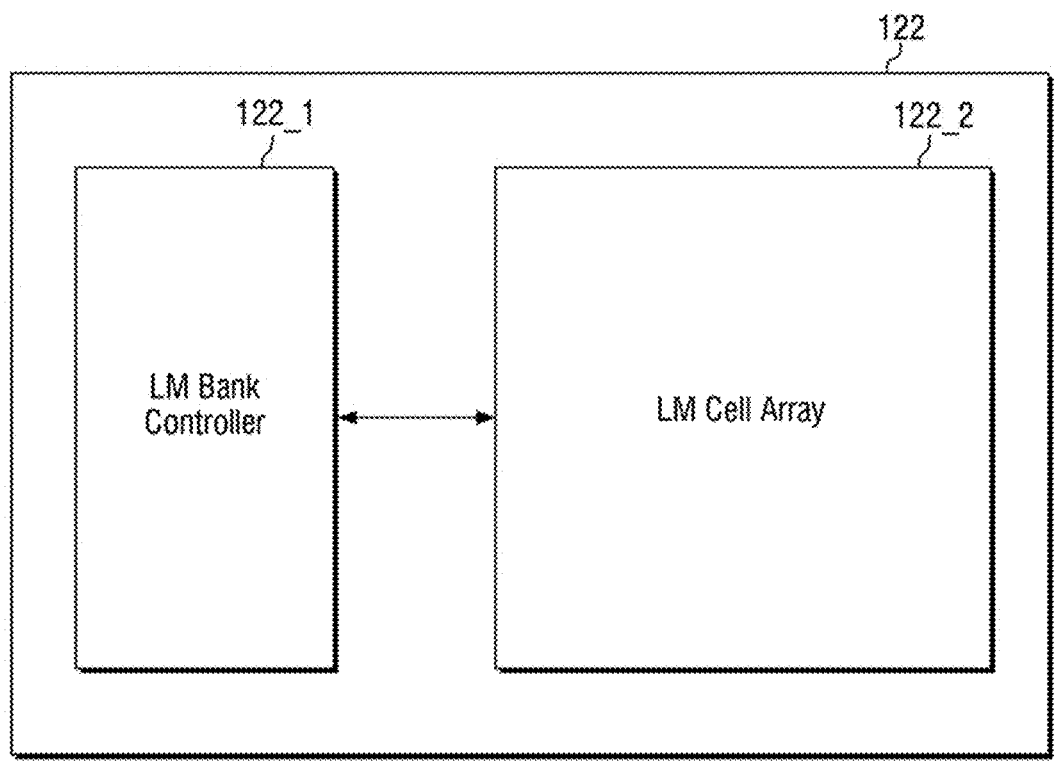
FIG. 20 is a block diagram for illustrating the local memory bank of FIG. 19 in detail.

FIG. 20 is a block diagram for illustrating the local memory bank of FIG. 19 in detail.

Referring to FIG. 20, the local memory bank 122 may include a local memory bank controller 122_1 and a local memory bank cell array 122_2.

The local memory bank controller 1221 may manage read and write operations via the addresses of data stored in the local memory bank 122. In some embodiments, the local memory bank controller 122_1 may manage the input/output of data as a whole.

The local memory bank cell array 1222 may be of a structure in which cells in which data are directly stored are arranged in rows and columns. The local memory bank cell array 122_2 may be controlled by the local memory bank controller 122_1.

Figure 21:
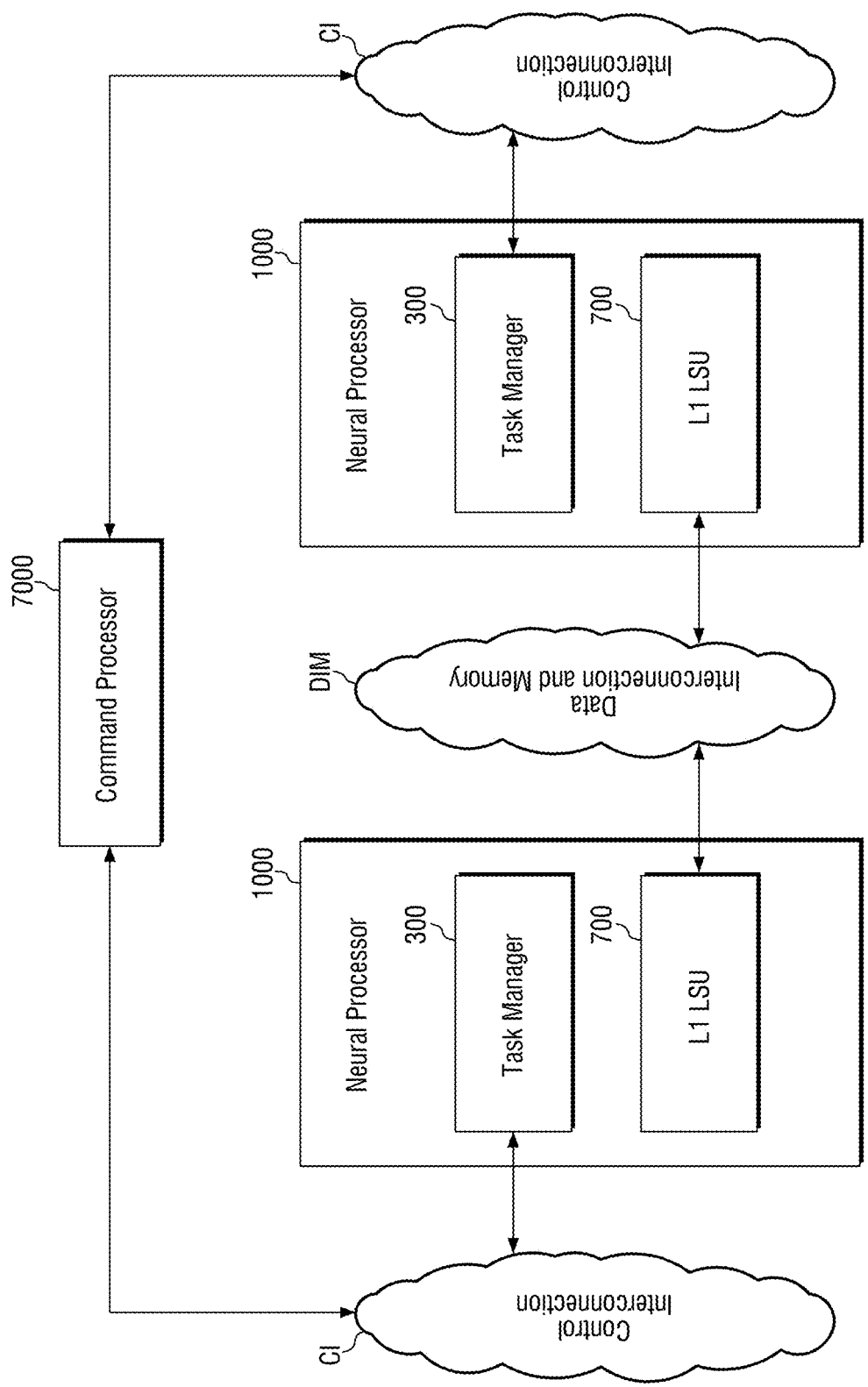
FIG. 21 is a block diagram for illustrating a flow of data and control signals of the neural processing device of FIG. 1.
Figure 22:
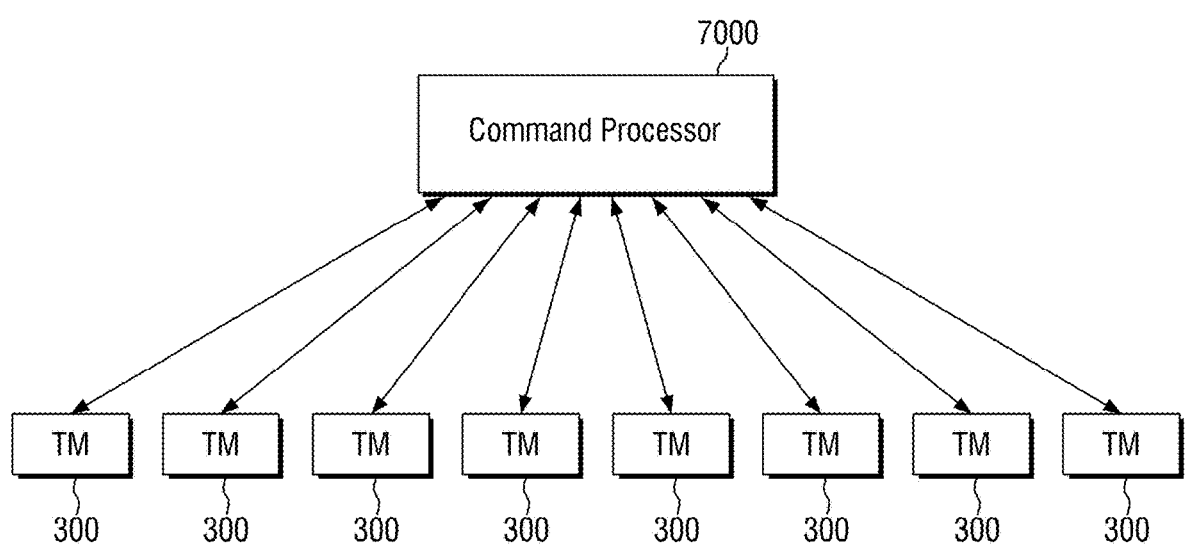
FIG. 22 is a block diagram for illustrating relationship between the command processor and the task managers of FIG. 21.

FIG. 21 is a block diagram for illustrating a flow of data and control signals of the neural processing device of FIG. 1, and FIG. 22 is a block diagram for illustrating relationship between the command processor and the task managers of FIG. 21.

Referring to FIGS. 21 and 22, the neural processor 1000 may include at least one neural core 100. Each neural processor 1000 may include a task manager 300 and an L1 LSU 700 therein, respectively. The task managers 300 may exchange control signals and responses to the control signals with a command processor 7000 via a control interconnection CI.

In contrast, the L1 LSU 700 may exchange data via a data interconnection and memory DIM. The data interconnection and memory DIM may include an interconnection for transmitting data and a memory in which data are shared. Specifically, the data interconnection and memory DIM may include a local interconnection 500 and a data channel 6100. In addition, the data interconnection and memory DIM may include an L1 shared memory 400, a shared memory 2000, and a volatile memory 32. However, the embodiment is not limited thereto.

The task managers 300 may be controlled by the command processor 7000. That is, the command processor 7000 may transfer tasks to the task managers 300 via control signals, and the task managers 300 may transfer task completion reports to the command processor 7000. At least one task manager 300 may be included in the neural processor 1000. Moreover, if the neural processors 1000 are plural, the number of task managers 300 may get larger. Such a plurality of task managers 300 may all be controlled by the command processor 7000.

Figure 23:
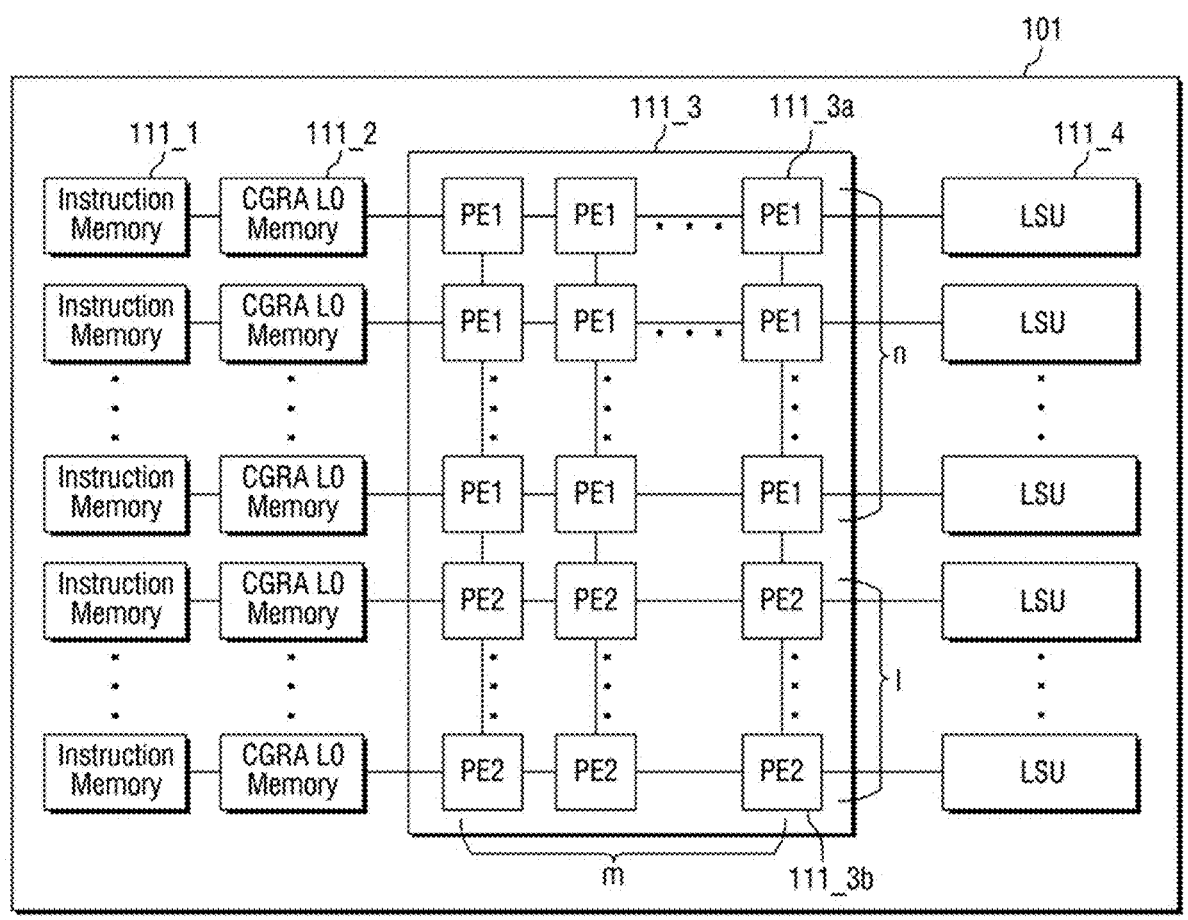
FIG. 23 is a block diagram for illustrating the structure of the neural processing device in accordance with some embodiments of the disclosure in detail.

FIG. 23 is a block diagram for illustrating in detail the structure of the neural processing device in accordance with some embodiments of the disclosure.

Referring to FIG. 23, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In this case, the instructions may instruct the operation of first type of a plurality of processing elements 111_3*a* included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In this case, the U) memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3*a* and a second type of a plurality of processing elements 111_3*b* therein.

The first type of the plurality of processing elements 111_3*a* and the second type of the plurality of processing elements 111_3*b* may be arranged in rows and columns. The first type of the plurality of processing elements 111_3*a* and the second type of the plurality of processing elements 111_3*b* may be arranged in m columns. In addition, the first type of the plurality of processing elements 111_3*a* may be arranged in n rows, and the second type of the plurality of processing elements 111_3*b* may be arranged in 1 rows. Accordingly, the first type of the plurality of processing elements 111_3*a* and the second type of the plurality of processing element 111_3*b* may be arranged in (n+1) rows and m columns.

The LSU 111_4 may receive at least one of data, a control signal, or a synchronization signal from the outside via the local interconnection 500. The LSU 111_4 may transmit at least one of the received data, control signal, or synchronization signal to the CGRA L0 memory 111_2. Similarly, the LSU 111_4 may transfer at least one of the data, control signal, or synchronization signal to the outside via the local interconnection 500.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In some embodiments, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 24:
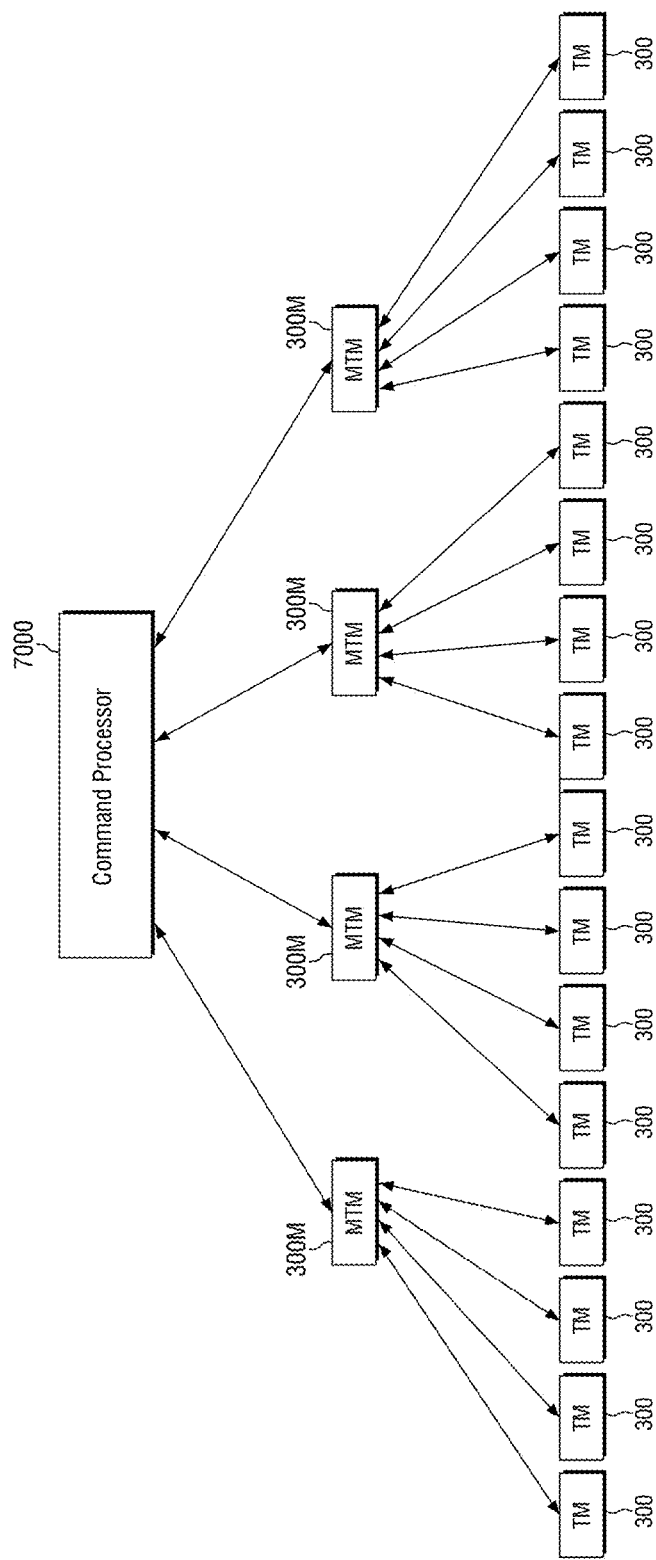
FIG. 24 is a diagram for illustrating a hierarchical structure of a command processor and task managers of a neural processing device in accordance with some embodiments of the disclosure.
Figure 25:
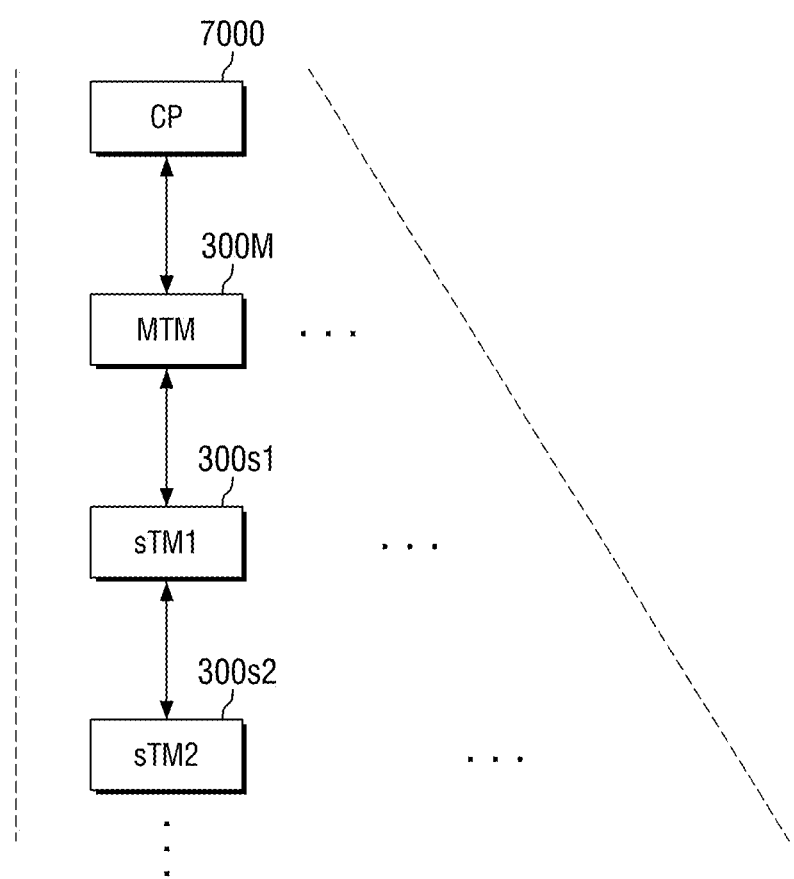
FIG. 25 is a diagram for illustrating a hierarchical structure of a command processor and task managers of a neural processing device in accordance with some embodiments of the disclosure.

FIG. 24 is a diagram for illustrating a hierarchical structure of a command processor and task managers of a neural processing device in accordance with some embodiments of the disclosure, and FIG. 25 is a diagram for illustrating a hierarchical structure of a command processor and task managers of a neural processing device in accordance with some embodiments of the disclosure.

Referring to FIGS. 24 and 25, if a number of task managers 300 increases, it may be difficult for the command processor 7000 to manage all of the task managers 300. Therefore, the neural processing device 1 in accordance with some embodiments of the disclosure may have a hierarchical structure in which each of master task managers 300M manages the plurality of task managers 300 and the command processor 7000 manages the master task managers 300M.

Further, referring to FIG. 25, levels below one of the master task manager 300M may also be subdivided into a plurality. For example, a first sub-task manager 300s1 and a second sub-task manager 300s2 may form each layer. That is, one first sub-task manager 300s1 may manage at least one second sub-task manager 300s2, and one master task manager 300M may manage at least one first sub-task manager 300s1. Additionally, several layers may be added below the second sub-task manager 300s2 as well.

That is, although three levels of the task manager 300, the master task manager 300M, and the command processor 7000 are shown in FIGS. 24 and 25, the number of levels may be four or more. In some embodiments, the depth of the hierarchical structure may vary as desired depending on the number of task managers 300.

Figure 26:
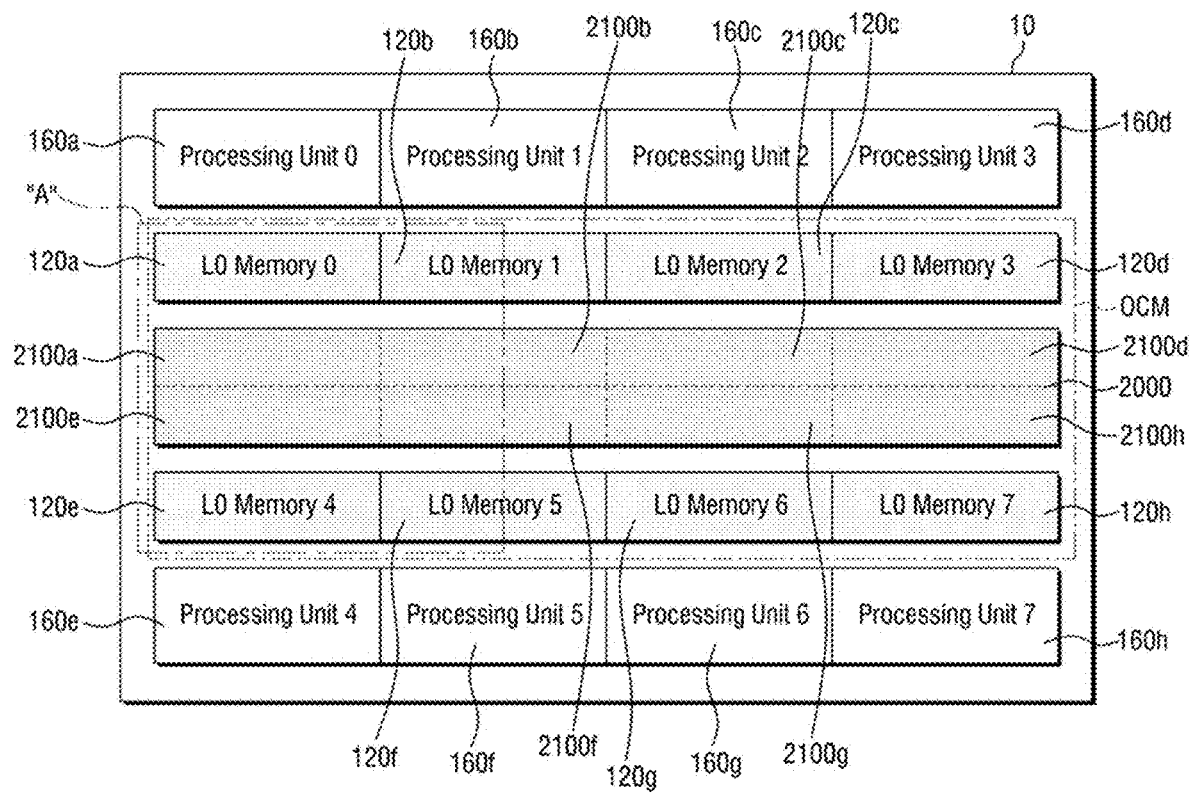
FIG. 26 is a block diagram for illustrating the memory reconstruction of the neural processing system in accordance with some embodiments of the disclosure.

FIG. 26 is a block diagram for illustrating memory reconfiguration of a neural processing system in accordance with some embodiments of the disclosure.

Referring to FIG. 26, the neural core SoC 10 may include first to eighth processing units 160a to 160h and an on-chip memory OCM. Although FIG. 26 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In some embodiments, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In some embodiments, the shared memory 2000 may operate in one of a L0 memory type or a global memory type. In some embodiments, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In some embodiments, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 27:
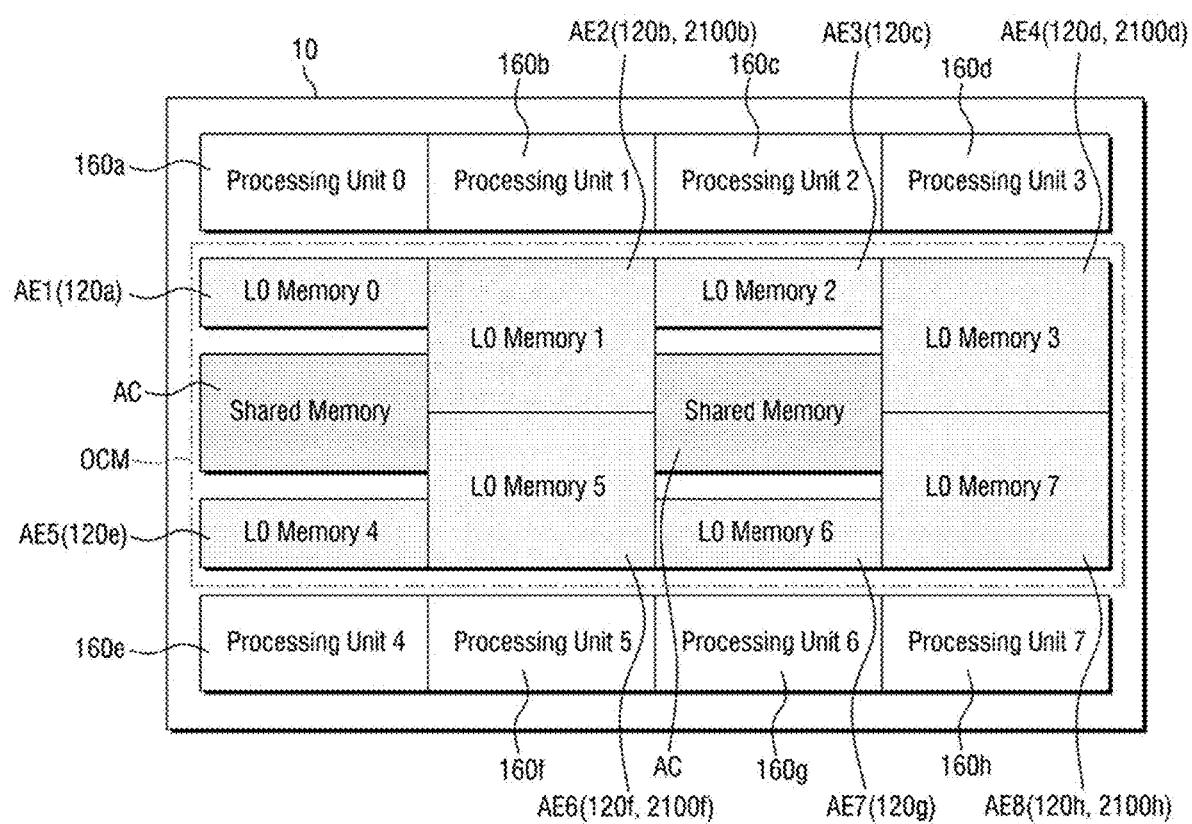
FIG. 27 is a block diagram for illustrating an example of the memory reconstruction of the neural processing system in accordance with some embodiments of the disclosure.

FIG. 27 is a block diagram showing an example of memory reconstruction of a neural processing system in accordance with some embodiments of the disclosure.

With reference to FIGS. 26 and 27, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

That is, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to computation tasks during the runtime, and may enhance the efficiency and speed of computation.

Figure 28:
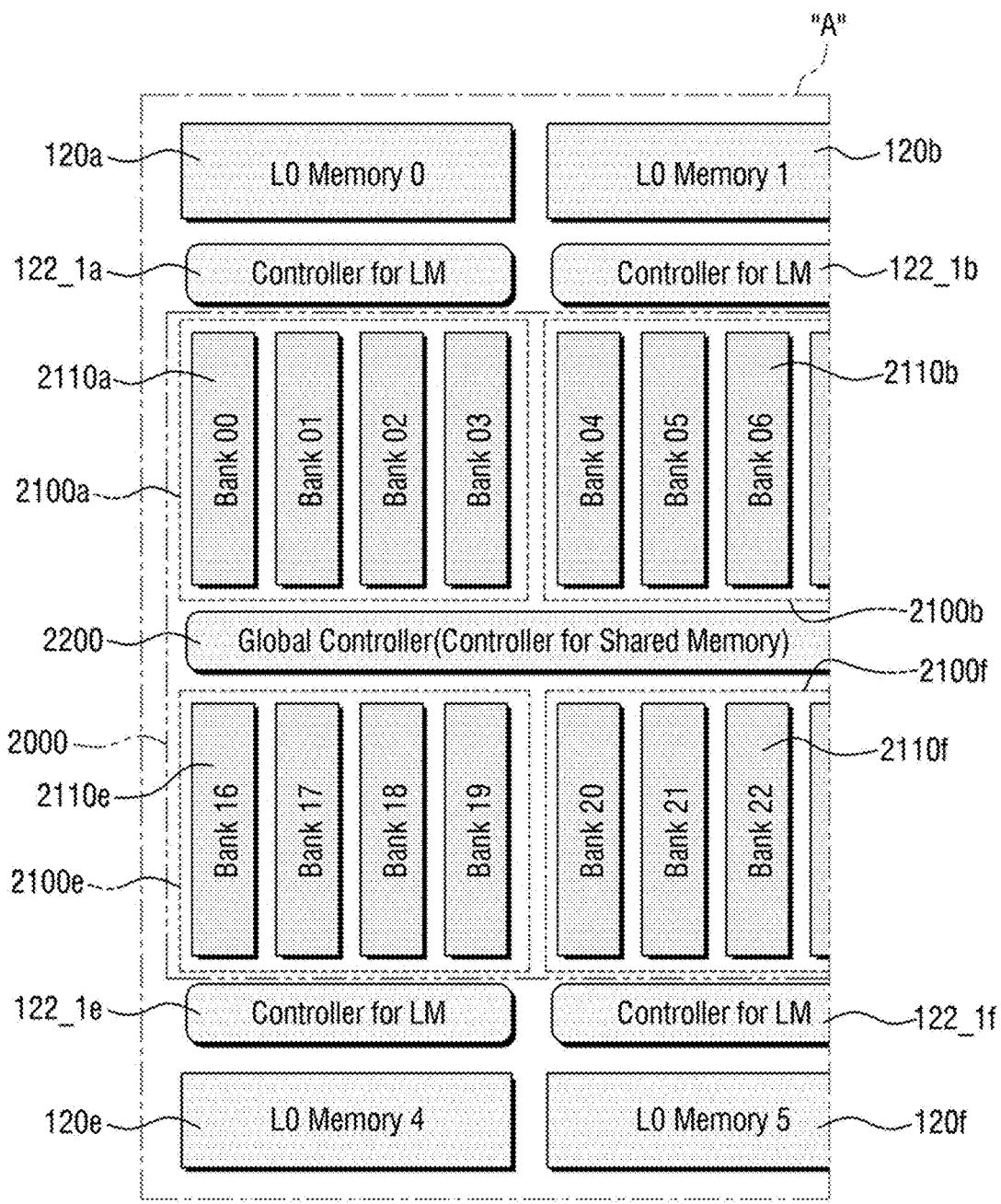
FIG. 28 is an enlarged block diagram of a portion A of FIG. 26.

FIG. 28 is an enlarged block diagram of a portion A of FIG. 26.

With reference to FIGS. 26 and 28, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 1221b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, each of the first L memory controller 122_1a, the second L0 memory controller 122_1b, the fifth L0 memory controller 122_1e, the sixth L0 memory controller 122_1f, and the global controller 2200 may be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In some embodiments, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In some embodiments, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In some embodiments, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when each of the first to eighth memory units 2100a to 2100h operate logically in the global memory type (i.e., when they do not operate logically in the L0 memory type).

In some embodiments, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110.

If the global controller 2200 controls at least one of the first to eighth memory units 2100*a* to 2100*h*, respectively, then the global controller 2200 may control the first to eighth memory units 2100*a* to 2100*h* as the global memory of the first to eighth processing units 160*a* to 160*h*, respectively. Accordingly, at least one of the first to eighth memory units 2100*a* to 2100*h* may operate at a clock frequency independent of the clock frequencies of the first to eighth processing units 160*a* to 160*h*, respectively. In some embodiments, if the global controller 2200 controls the i-th memory unit among the first to eighth memory units 2100*a* to 2100*h*, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100*a* to 2100*h* to the global interconnection 6000 of FIG. 3. The first to eighth memory units 2100*a* to 2100*h* may exchange data with the off-chip memory 30 of FIG. 2 by the control of the global controller 2200 or may respectively exchange data with the first to eighth L0 memories 120*a* to 120*h*.

Each of the first to eighth memory units 2100*a* to 2100*h* may include at least one memory bank. The first memory unit 2100*a* may include at least one first memory bank 2110*a*. The first memory banks 2110*a* may be areas obtained by dividing the first memory unit 2100*a* into certain sizes. The first memory banks 2110*a* may all be memory devices of the same size. However, the embodiment is not limited thereto. FIG. 28 illustrates that four memory banks are included in one memory unit.

Similarly, the second, fifth, and sixth memory units 2100*b*, 2100*e*, and 2100*f* may include at least one second, fifth, and sixth memory banks 2110*b*, 2110*e*, and 2110*f*, respectively.

In the following, the description will be made based on the first memory banks 2110*a* and the fifth memory banks 2110*e*, which may be the same as other memory banks including the second and sixth memory banks 2110*b* and 2110*f*.

Each of the first memory banks 2110*a* may operate logically in the L0 memory type or operate logically in the global memory type. In this case, the first memory banks 2110*a* may operate independently of the other memory banks in the first memory unit 2100*a*. However, the embodiment is not limited thereto.

If each memory bank operates independently, the first memory unit 2100*a* may include a first area operating in the same manner as the first L0 memory 120*a* and a second area operating in a different manner from the first L0 memory 120*a*. In this case, the first area and the second area do not necessarily coexist, but any one area may take up the entire first memory unit 2100*a*.

Likewise, the second memory unit 2100*b* may include a third area operating in the same manner as the second L0 memory 120*b* and a fourth area operating in a different manner from the second L0 memory 120*b*. In this case, the third area and the fourth area do not necessarily coexist, and any one area may take up the entire first memory unit 2100*a*.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In some embodiments, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 29:
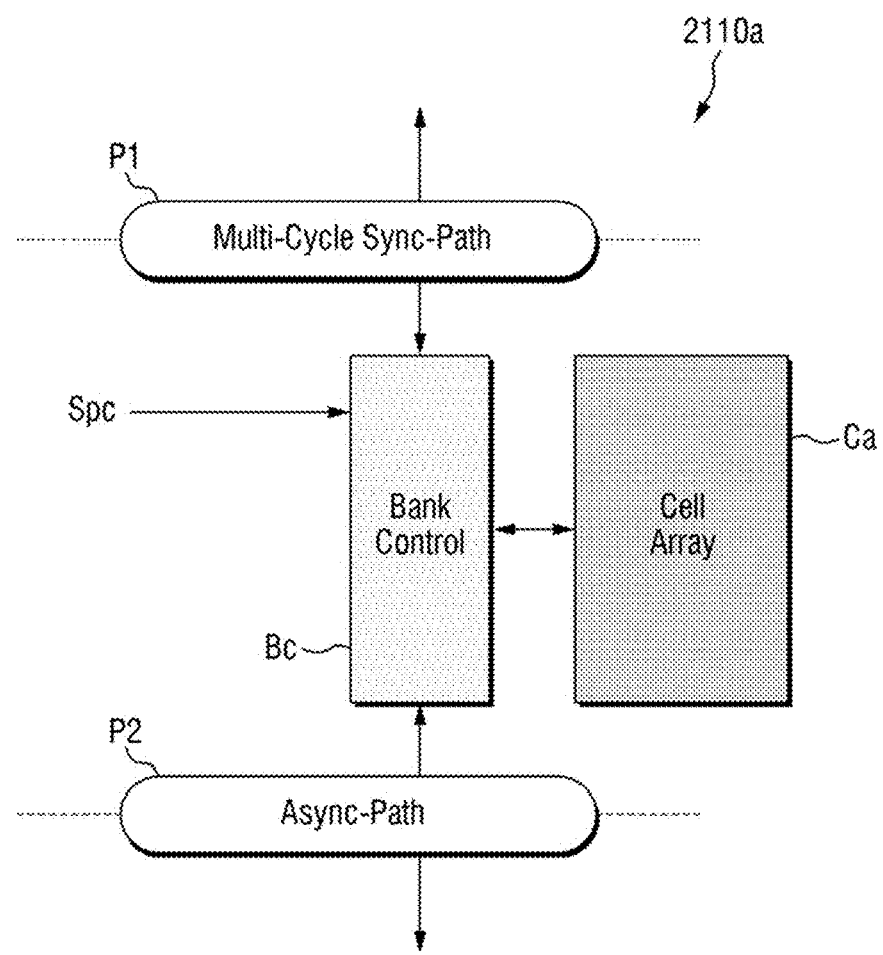
FIG. 29 is a diagram for illustrating the first memory bank of FIG. 28 in detail.

FIG. 29 is a diagram for illustrating the first memory bank of FIG. 28 in detail. Although FIG. 29 illustrates the first memory bank 2110*a*, other memory banks may also have the same structure as the first memory bank 2110*a*.

Referring to FIG. 29, the first memory bank 2110*a* may include a cell array Ca, a bank controller Bc, a first path unit P1, and a second path unit P2.

In this case, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, each of the bank controller Bc, the first path unit P1, and the second path unit P2 may be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In some embodiments, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In some embodiments, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In some embodiments, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In some embodiments, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 28.

The first path unit P1 may form a multi-cycle sync-path. In some embodiments, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 29, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In some embodiments, the first processing unit 160a may exchange data with the cell array Ca via the global interconnection 6000 and the second path unit P2. In this case, the cell array Ca may exchange data not only with the first processing unit 160a but also with other processing units.

In some embodiments, the second path unit P2 may be a data exchange path between the cell array Ca and all the processing units when the first memory bank 2110a is implemented logically in the global memory type. The second path unit P2 may include the global controller 2200 of FIG. 28.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 22, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In some embodiments, the bank controller Bc may use a first address system if exchanging data via the first path unit P1 and a second address system if exchanging data via the second path unit P2. In this case, the first address system and the second address system may be different from each other.

A bank controller Bc is not necessarily required for each memory bank. In some embodiments, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 28 and FIG. 29, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 29, the operating clock frequency of the second path unit P2 may operate at 1 GHz, as an example. This may be a frequency that is not synchronized with the operating clock frequency of 750 MHz of the bank controller Bc. In some embodiments, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units uses one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 30:
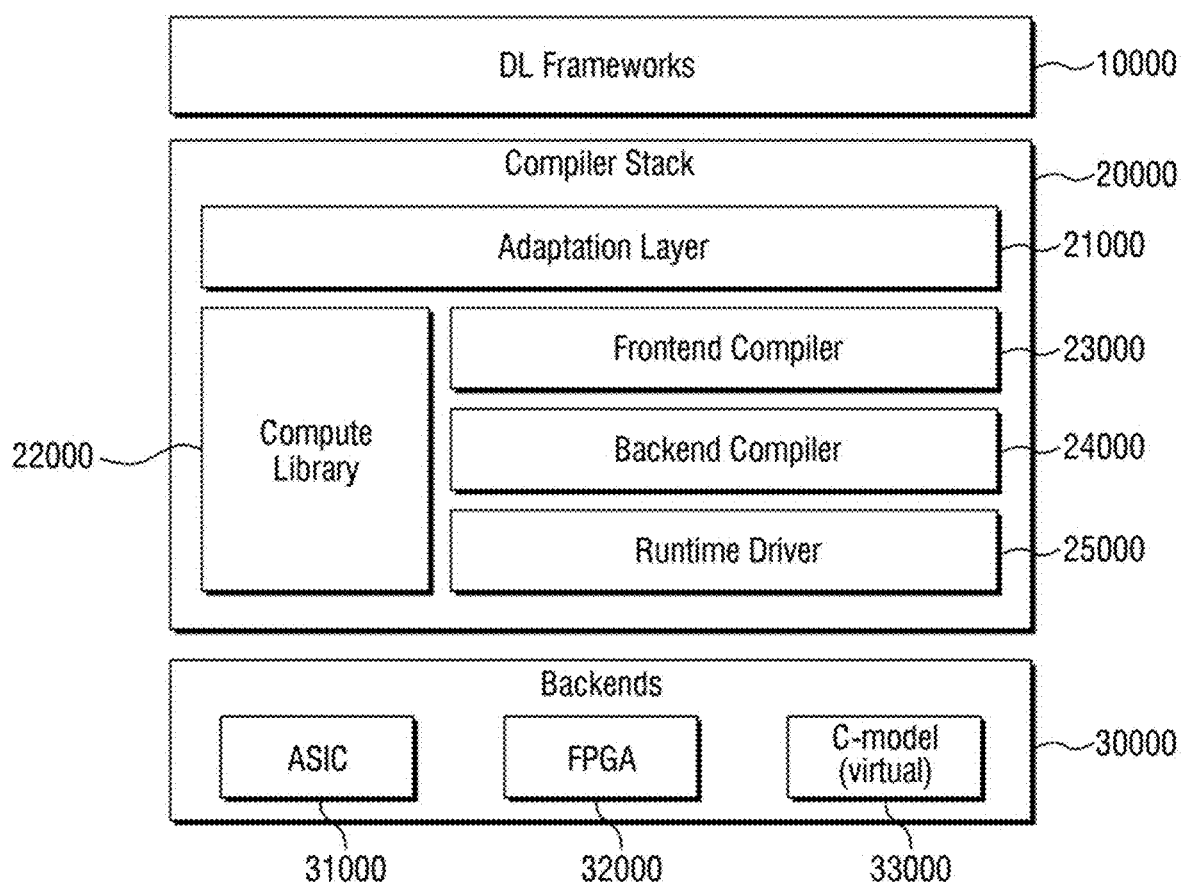
FIG. 30 is a block diagram for illustrating a software hierarchy of a neural processing device in accordance with some embodiments of the disclosure.

FIG. 30 is a block diagram for illustrating a software hierarchy of a neural processing device in accordance with some embodiments.

Referring to FIG. 30, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 31:
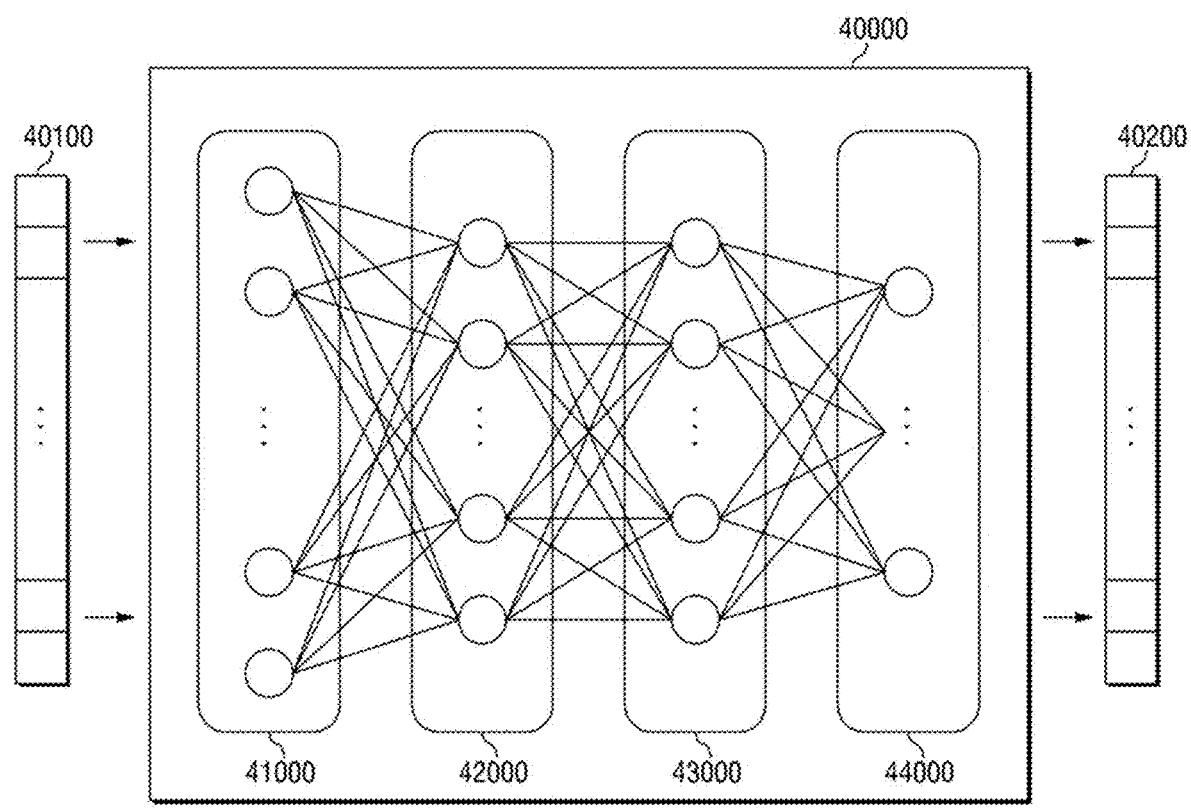
FIG. 31 is a conceptual diagram for illustrating deep learning calculations performed by a neural processing device in accordance with some embodiments of the disclosure.

FIG. 31 is a conceptual diagram for illustrating deep learning calculations performed by a neural processing device in accordance with some embodiments.

Referring to FIG. 31, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 31, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 32:
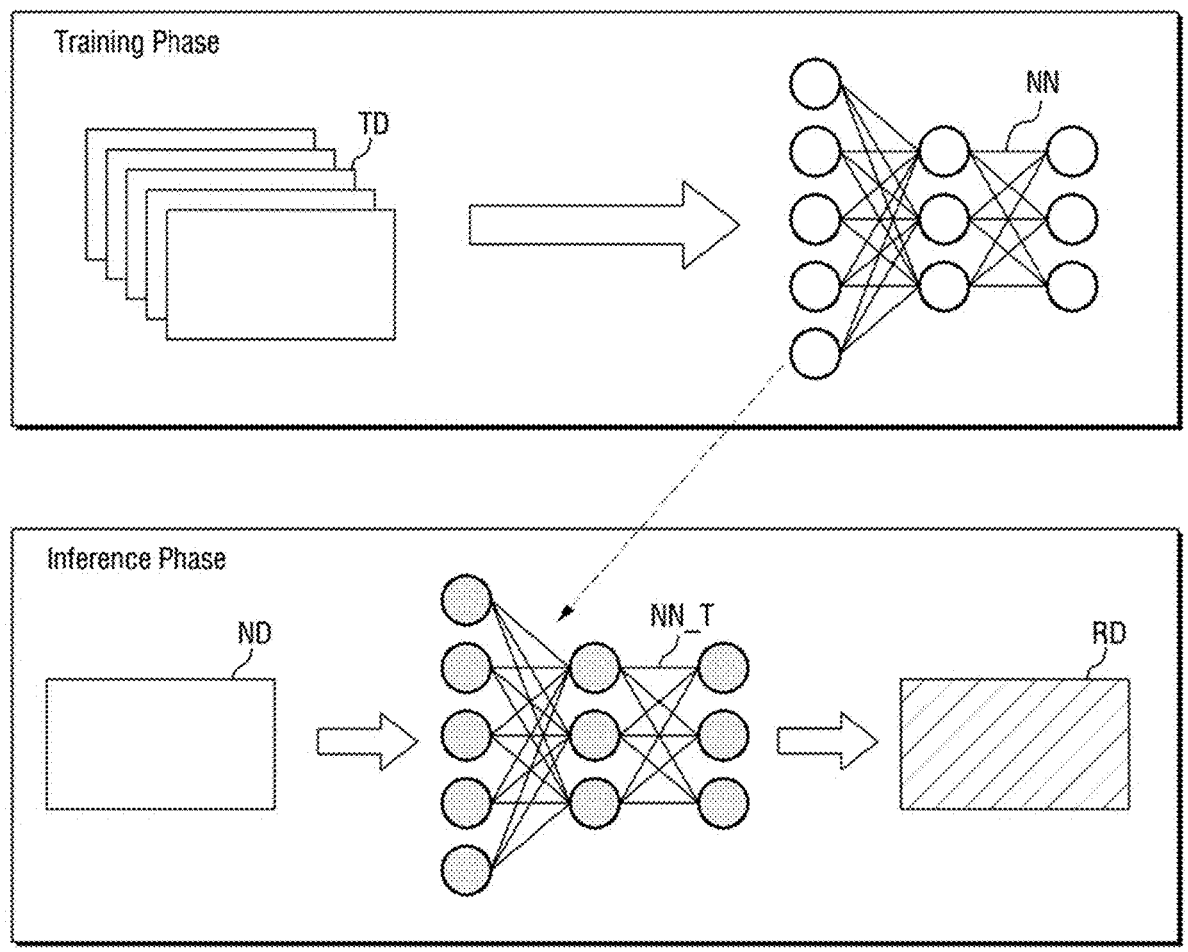
FIG. 32 is a conceptual diagram for illustrating training and inference operations of a neural network of a neural processing device in accordance with some embodiments of the disclosure.

FIG. 32 is a conceptual diagram for illustrating training and inference operations of a neural network of a neural processing device in accordance with some embodiments.

Referring to FIG. 32, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

According to some aspects of the disclosure, a neural processor includes a core array comprising a first neural core and a second neural core, each of which includes controllable port, a memory configured to output data to the core array and receive data as input from the core array and a task manager configured to configure data paths of the core array, wherein the a core array includes a first data line configured to transmit data in a first direction, a second data line configured to transmit data in a second direction opposite to the first direction, a first connection line connected to the a first data line and the first neural core, a second connection line connected to the a second data line and the first neural core, a third connection line connected to the a first data line and the second neural core and a fourth connection line connected to the a second data line and the second neural core, and wherein the first neural core and the second neural core are connected in series via the first data line and the second data line.

According to some aspects, the task manager configures the data paths by controlling on/off of the controllable port included in each of the first neural core and the second neural core.

According to some aspects, the memory includes a first memory connected to the first neural core via the first data line and the second data line, the first neural core comprises a first L0 memory connected to the first connection line and the second connection line, and the second neural core comprises a second L0 memory connected to the third connection line and the fourth connection line.

According to some aspects, the task manager configures a first data path comprising a path through which data are provided from the first memory toward the first L0 memory, from the first L0 memory toward the second L0 memory, and a path through which data are provided from the second L0 memory toward the first L0 memory and from the first L0 memory toward the first memory, by controlling the controllable port.

According to some aspects, the memory further includes a second memory connected to the second neural core via the first data line and the second data line.

According to some aspects, the task manager configures a second data path through which data are provided from the first memory toward the first L0 memory, from the first L0 memory toward the second L0 memory, and from the second L0 memory toward the second memory, and a third data path through which data are provided from the second memory toward the second L0 memory, from the second L0 memory toward the first L0 memory and from the first L0 memory toward the first memory, by controlling the controllable port.

According to some aspects, the task manager configures a fourth data path through which data are provided from the first memory toward the first L0 memory and from the first L0 memory toward the first memory by controlling the controllable port, and configures a fifth data path through which data are provided from the second memory toward the second L0 memory and from the second L0 memory toward the second memory by controlling the controllable port.

According to some aspects, the task manager configures a sixth data path through which data are provided from the first memory toward the first L0 memory and from the first L0 memory toward the second memory by controlling the controllable port.

According to some aspects, the first data line comprises a plurality of data lines, and the task manager turns off some of the plurality of data lines included in the first data line by controlling the controllable port.

According to some aspects, the core array includes a first core array comprising the first neural core and the second neural core and a second core array comprising a third neural core and a fourth neural core that are different from the first neural core and the second neural core, wherein the third neural core and the fourth neural core are connected in series with each other via a third data line and a fourth data line that are different from the first data line and the second data line.

According to some aspects, the neural processor further includes an interconnection through which data are moved, wherein the memory, the first core array, and the second core array are connected to the interconnection, and data are moved between the memory, the first core array, and the second core array via the interconnection.

According to some aspects, the memory includes an L1 shared memory shared by the first neural core and the second neural core.

According to some aspects, the core array is included in a neural core system-on-chip, and the memory includes an off-chip memory external to the neural core system-on-chip.

According to some aspects, the neural processor further includes a first neural processor comprising the core array, a second neural processor that is different from the first neural processor and a shared memory shared by the first neural processor and the second neural processor, wherein the memory comprises the shared memory.

According to some aspects, the controllable ports are implemented by software or firmware.

According to some aspects of the disclosure, a neural processor includes a first neural core, a second neural core connected in series with the first neural core in a first direction, a third neural core connected in series with the second neural core in the first direction, a first memory connected in series with the first neural core in a second direction, which is different from the first direction, and a task manager configured to configure data paths of the first neural core, the second neural core, the third neural core, and the first memory, wherein the data paths include a data movement path in the first direction and a data movement path in the second direction, and the task manager can configure the data paths even when at least one of the first neural core, the second neural core, or the third neural core is inoperative.

According to some aspects, if the first neural core and the third neural core are operative and the second neural core is inoperative, by the task manager, the first neural core is provided with first data from the first memory and generates second data by computing the first data, the second neural core is provided with the second data from the first neural core and provides the second data to the third neural core, and the third neural core is provided with the second data from the second neural core and generates third data by computing the second data.

According to some aspects, data lines connecting the first neural core to the third neural core include a plurality of lines, and the task manager turns on all of the plurality of lines or turns off some of the plurality of lines according to bandwidths of data provided from the first memory.

According to some aspects, the neural processor further includes a fourth neural core that is not directly connected to the first neural core, a fifth neural core connected in series with the fourth neural core in the first direction, and an interconnection configured to perform data exchange between the first neural core and the fourth neural core.

According to some aspects of the disclosure, a neural processor includes a first neural core, a second neural core connected in series with the first neural core in a first direction, a third neural core connected in series with the second neural core in the first direction, a first memory connected in series with the first neural core in a second direction, which is different from the first direction, and a task manager configured to set data paths of the first neural core, the second neural core, the third neural core, and the first memory, wherein the task manager can configure the data paths in real time.

In the present disclosure, the neural processing device 1, the neural Core SoC 10, the CPU 20, the neural processor 1000, the non-volatile memory controller 4000, the volatile memory controller 5000, the neural core 100, the command processor 7000, the task manager 300 and the processing unit 160 may be referred to as a processor.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A processing device comprising:
   a first set of processors comprising a first processor and a second processor, each of which comprises at least one controllable port;
   a first memory operably coupled to the first set of processors;
   at least one forward data line configured for one-way transmission of data in a forward direction between the first set of processors; and
   at least one backward data line configured for one-way transmission of data in a backward direction between the first set of processors, and
   wherein the first set of processors are operably coupled in series via the at least one forward data line and the at least one backward data line,
   wherein the first set of processors performs a computation,
   a data path for the first set of processors is determined among a plurality of candidate data paths according to a type of the computation, and
   the determined data path is configured on the at least one forward data line and the at least one backward data line by controlling controllable ports of the first set of processors.

2. The processing device of claim 1, wherein a forward data path is configured by turning on a controllable port on the at least one forward data line between the first processor and the second processor and data is transmitted via the forward data path from the first processor to the second processor.

3. The processing device of claim 2, wherein a backward data path is configured by turning on a controllable port on the at least one backward data line between the first processor the second processor and data is transmitted via the backward data path from the second processor to the first processor.

4. The processing device of claim 1,
   wherein the determined data path comprises a first and second forward sub-paths configured on the at least one forward data line and a first and second backward sub-paths configured on the at least one backward data line, and
   wherein the first forward sub-path is from the first memory to the first processor,
   the second forward sub-path is from the first processor to the second processor,
   the first backward sub-path is from the second processor to the first processor, and
   the second backward sub-path is from the first processor to the first memory.

5. The processing device of claim 4, wherein the determined data path further comprises a third forward sub-path configured on the at least one forward data line and a third backward sub-path configured on the at least one backward data line,
   the third forward sub-path is from the second processor to a second memory, and
   the third backward sub-path is from the second memory to the second processor, and
   wherein the second memory is the same as or different from the first memory.

6. The processing device of claim 1,
   wherein a first data path is configured by controlling controllable ports of the first set of processors, the first data path comprises a forward sub-path configured on the at least one forward data line and a backward sub-path configured on the at least one backward data line, the forward sub-path of the first data path is from the first memory to the first processor, and the backward sub-path of the first data path is from the first processor to the first memory, wherein a second data path is configured by controlling controllable ports of the first set of processors, the second data path comprises a forward sub-path configured on the at least one forward data line and a backward sub-path configured on the at least one backward data line, the backward sub-path of the second data path is from a second memory to the second processor, and the forward sub-path of the second data path is from the second processor to the second memory, and wherein the second memory is the same as or different from the first memory.

7. The processing device of claim 1, wherein the determined data path comprises first and second forward sub-paths configured on the at least one forward data line, the first forward sub-path is from the first memory to the first processor, and the second forward sub-path is from the first processor to a second memory, and wherein the second memory is the same as or different from the first memory.

8. The processing device of claim 1, wherein the at least one forward data line comprises a plurality of forward data lines, and some of the plurality of forward data lines are turned off by controlling controllable ports of the first set of processors.

9. The processing device of claim 1, further comprising:

a second set of processors comprising a third processor and a fourth processor, wherein the second set of processors are connected in series with each other via a forward data line and a backward data line between the second set of processors.

10. The processing device of claim 9, further comprising an interconnection through which data are moved, wherein the first memory, the first set of processors, and the second set of processors are connected to the interconnection, and data are moved between the first memory, the first set of processors, and the second set of processors via the interconnection.

11. The processing device of claim 1, further comprising:

at least one first connection line connected to the at least one forward data line and the first processor;

at least one second connection line connected to the at least one backward data line and the first processor;

at least one third connection line connected to the at least one forward data line and the second processor; and at least one fourth connection line connected to the at least one backward data line and the second processor.

12. The processing device of claim 1, wherein the first set of processors are included in a system-on-chip, and the first memory comprises an off-chip memory external to the system-on-chip.

13. The processing device of claim 1, further comprising:

a second set of processors comprising a third processor and a fourth processor; and a shared memory shared by the first set of processors and the second set of processors, wherein the first memory comprises the shared memory.

14. The processing device of claim 1, wherein controllable ports of the first set of processors are implemented by software or firmware.

15. A processing device comprising:

a first set of processors comprising a first processor, a second processor connected in series with the first processor in a forward direction, and a third processor connected in series with the second processor in the forward direction; and a first memory connected in series with the first processor in a backward direction, wherein the first set of processors performs a computation, a data path for the first set of processors is determined among a plurality of candidate data paths according to a type of the computation, the determined data path is configured on the at least one forward data line and the at least one backward data line by controlling controllable ports of the first set of processors, wherein the determined data path comprises a data movement path in the forward direction and a data movement path in the backward direction, and the determined data path is configured even when at least one of the first processor, the second processor, or the third processor is inoperative.

16. The processing device of claim 15, wherein if the first processor and the third processor are operative and the second processor is inoperative, the first processor is provided with first data from the first memory and generates second data by computing the first data, the second processor is provided with the second data from the first processor and provides the second data to the third processor, and the third processor is provided with the second data from the second processor and generates third data by computing the second data.

17. The processing device of claim 15, wherein data lines connecting the first processor to the third processor comprise a plurality of lines, and all of the plurality of lines are turned on or some of the plurality of lines are turned off according to a bandwidth of data provided from the first memory.

18. The processing device of claim 15, further comprising:

a fourth processor that is not directly connected to the first processor;

a fifth processor connected in series with the fourth processor in the forward direction; and an interconnection configured to perform data exchange between the first processor and the fourth processor.

19. A processing device comprising:

a first set of processors comprising a first processor, a second processor connected in series with the first processor in a forward direction, and a third processor connected in series with the second processor in the forward direction; and a first memory connected in series with the first processor in a backward direction, wherein the first set of processors performs a computation, a data path for the first set of processors is determined among a plurality of candidate data paths according to a type of the computation, and the determined data path is configured in real time on the at least one forward data line and the at least one backward data line by controlling controllable ports of the first set of processors.

* * * * *